United States Patent
Humpal et al.

(10) Patent No.: US 9,884,330 B2
(45) Date of Patent: *Feb. 6, 2018

(54) BROADBAND SPRAY NOZZLE SYSTEMS AND METHODS

(71) Applicant: Deere & Company, Moline, IL (US)

(72) Inventors: Richard A. Humpal, Ankeny, IA (US); Travis G. Funseth, Ankeny, IA (US)

(73) Assignee: DEERE & COMPANY, Moline, IL (US)

(*) Notice: Subject to any disclaimer, the term of this patent is extended or adjusted under 35 U.S.C. 154(b) by 247 days.

This patent is subject to a terminal disclaimer.

(21) Appl. No.: 14/505,944

(22) Filed: Oct. 3, 2014

(65) Prior Publication Data

US 2015/0367357 A1 Dec. 24, 2015

Related U.S. Application Data

(60) Provisional application No. 62/015,315, filed on Jun. 20, 2014, provisional application No. 62/050,530, filed on Sep. 15, 2014.

(51) Int. Cl.
*A01M 7/00* (2006.01)
*B05B 1/30* (2006.01)
(Continued)

(52) U.S. Cl.
CPC .............. *B05B 1/30* (2013.01); *A01B 79/005* (2013.01); *A01G 25/16* (2013.01); *A01G 25/162* (2013.01);
(Continued)

(58) Field of Classification Search
CPC .. A01M 7/005; A01M 7/0053; A01M 7/0057; A01M 7/0071; A01M 7/0089;
(Continued)

(56) References Cited

U.S. PATENT DOCUMENTS 3,866,832 A 2/1975 Noguchi
3,967,783 A 7/1976 Halsted et al.
(Continued)

FOREIGN PATENT DOCUMENTS

CN 103096714 A 5/2013
CN 203164717 U 8/2013
(Continued)

OTHER PUBLICATIONS

Combo-Rate [online product brochure]. Wilger Industries Ltd. [retrieved on Sep. 25, 2014]. Retrieved from the Internet: <http://www.heartlandag.com/assets/images/parts/wilger/nozzle/pdf_83.pdf>.

(Continued)

*Primary Examiner* — Alexander Valvis

(57) ABSTRACT

An individual spray nozzle contains two or more valves that are actuated by time or frequency modulated signals such as pulse width modulated (PWM) signals. The PWM signals are interleaved to open and close each of the respective valves that enable fluid to flow from an input to a combined output. The opening and closing positions of two or more different valves are interleaved to increase the range of performance, such as to increase the frequency of fluid flow from the input to the combined output. Additional embodiments are described.

20 Claims, 18 Drawing Sheets

(51) Int. Cl.
*A01G 25/16* (2006.01)
*B05B 12/00* (2006.01)
*A01B 79/00* (2006.01)
*B05B 15/06* (2006.01)
*B05B 12/12* (2006.01)
*B05B 13/00* (2006.01)
*B05B 1/16* (2006.01)
*B05B 3/02* (2006.01)
*B05B 13/04* (2006.01)
*B05B 7/04* (2006.01)
*B05B 12/04* (2006.01)
*B05B 12/06* (2006.01)

(52) U.S. Cl.
CPC ......... *A01M 7/0089* (2013.01); *B05B 12/004* (2013.01); *B05B 12/12* (2013.01); *B05B 12/126* (2013.01); *B05B 13/005* (2013.01); *B05B 15/061* (2013.01); *B05B 1/16* (2013.01); *B05B 3/02* (2013.01); *B05B 7/04* (2013.01); *B05B 12/04* (2013.01); *B05B 12/06* (2013.01); *B05B 13/0421* (2013.01)

(58) Field of Classification Search
CPC ... A01M 7/0096; A01G 25/16; A01G 25/162; A01G 25/165; B05B 1/083; B05B 1/1645; B05B 1/169; B05B 1/20; B05B 1/30; B05B 12/004; B05B 12/04; B05B 12/06
USPC ....... 239/170, 124–127; 137/599.05–599.07, 137/599.11–599.14, 601.14
See application file for complete search history.

(56) References Cited

U.S. PATENT DOCUMENTS

| | | | |
|---|---|---|---|
| 3,999,572 A * | 12/1976 | Mohr | F17D 1/14 137/599.07 |
| 4,004,733 A | 1/1977 | Law | |
| 4,030,523 A * | 6/1977 | Cram | A23G 9/228 137/599.07 |
| 4,058,260 A | 11/1977 | Lestradet | |
| 4,232,707 A * | 11/1980 | Sturman | A01G 25/162 137/624.2 |
| 4,313,465 A | 2/1982 | Holzem et al. | |
| 4,644,967 A * | 2/1987 | Wyatt | F22B 1/26 137/599.05 |
| 4,649,818 A | 3/1987 | Switall et al. | |
| 4,749,126 A | 6/1988 | Kessener et al. | |
| 4,907,516 A | 3/1990 | Rogers | |
| 5,134,961 A | 8/1992 | Giles et al. | |
| 5,267,690 A | 12/1993 | Gazzoni | |
| 5,278,423 A | 1/1994 | Wangler et al. | |
| 5,296,702 A | 3/1994 | Beck et al. | |
| 5,356,077 A | 10/1994 | Shames et al. | |
| 5,441,203 A | 8/1995 | Swan et al. | |
| 5,475,614 A | 12/1995 | Tofte et al. | |
| 5,518,181 A | 5/1996 | Shames et al. | |
| 5,539,624 A | 7/1996 | Dougherty | |
| 5,653,389 A | 8/1997 | Henderson et al. | |
| 5,763,873 A | 7/1998 | Beck et al. | |
| 5,793,035 A | 8/1998 | Beck et al. | |
| 5,873,647 A | 2/1999 | Kurtz et al. | |
| 5,878,960 A | 3/1999 | McInerney, II et al. | |
| 5,938,123 A | 8/1999 | Heitzman | |
| 6,021,960 A | 2/2000 | Kehat | |
| 6,193,166 B1 | 2/2001 | Miller et al. | |
| 6,325,302 B1 | 12/2001 | Guzowski et al. | |
| 6,444,090 B1 | 9/2002 | Wolf et al. | |
| 6,596,996 B1 | 7/2003 | Stone et al. | |
| 6,675,988 B2 | 1/2004 | Cline et al. | |
| 6,877,675 B2 | 4/2005 | Benneweis | |
| 6,918,757 B2 | 7/2005 | Nakamura et al. | |
| 7,066,402 B2 | 6/2006 | Goebel et al. | |
| 7,280,047 B2 | 10/2007 | Giles et al. | |
| 8,109,448 B2 | 2/2012 | Giles | |
| 8,191,795 B2 | 6/2012 | Grimm et al. | |
| 8,523,085 B2 | 9/2013 | Grimm et al. | |
| 8,636,175 B2 | 1/2014 | Smith | |
| 2001/0000611 A1 | 5/2001 | Cline et al. | |
| 2004/0195356 A1* | 10/2004 | Ellsworth | A01M 7/0053 239/166 |
| 2005/0000277 A1 | 1/2005 | Giles | |
| 2006/0255176 A1 | 11/2006 | Yeiser | |
| 2009/0194604 A1 | 8/2009 | Smith | |
| 2010/0032492 A1 | 2/2010 | Grimm et al. | |
| 2010/0237165 A1 | 9/2010 | Krueger | |
| 2011/0160920 A1 | 6/2011 | Orr et al. | |
| 2011/0174893 A1 | 7/2011 | Allan et al. | |
| 2012/0168532 A1 | 7/2012 | Giles | |
| 2012/0228395 A1 | 9/2012 | Needham et al. | |
| 2013/0161419 A1 | 6/2013 | Funseth et al. | |
| 2013/0168473 A1 | 7/2013 | Langkamp | |
| 2013/0284826 A1 | 10/2013 | Funseth et al. | |
| 2013/0284827 A1 | 10/2013 | Humpal et al. | |
| 2015/0289443 A1* | 10/2015 | Garuti | A01M 7/006 239/444 |

FOREIGN PATENT DOCUMENTS

| | | |
|---|---|---|
| DE | 19715136 A1 | 10/1998 |
| DE | 102007008787 A1 | 8/2008 |
| DE | 202007018966 U1 | 12/2009 |
| DE | 202011003270 U1 | 4/2011 |
| EP | 0362241 B1 | 6/1994 |
| EP | 2227949 A1 | 9/2010 |
| EP | 1961300 B1 | 3/2011 |
| EP | 1961299 B1 | 6/2011 |
| EP | 2522432 A1 | 11/2012 |
| EP | 2522433 A1 | 11/2012 |
| EP | 2606979 A1 | 6/2013 |
| GB | 2165469 A | 4/1986 |
| GB | 2337984 A | 8/1999 |
| SU | 1544333 A1 | 2/1990 |
| WO | 1998057539 A1 | 12/1998 |
| WO | 2013109272 A1 | 7/2013 |
| WO | 2014067785 A1 | 5/2014 |

OTHER PUBLICATIONS

Combo-Rate Nozzle Bodies [online product brochure]. Wilger Industries Ltd. [retrieved on Sep. 25, 2014]. Retrieved from the Internet: <http://www.wilger.net/images/downloads/COMBO_RATE_Nozzle_Bodies.pdf>.

Electronic Modules, Electronics Packaging [online]. Interplex Industries, Inc., 2014 [retrieved on Oct. 2, 2014]. Retrieved from the Internet: <http://www.interplex.com/electronic-packaging>.

Grisso, Robert; Alley, Mark; Thomason, Wade; Holshouser, David; Roberson, Gary T. Precision Farming Tools: Variable-Rate Application [online]. College of Agriculture and Life Sciences, Virginia Polytechnic Institute and State University, 2011 [retrieved on Sep. 25, 2014]. Retrieved from the Internet: <http://pubs.ext.vt.edu/442/442-505/442-505_PDF.pdf>.

Hypro Duo React [online]. Pentair LTD, 2014 [retrieved on Sep. 25, 2014]. Retrieved from the Internet: <http://www.hypropumps.com/resources/images/27793.pdf>.

Insert Molding [online]. Interplex Industries, Inc., 2014 [retrieved on Oct. 2, 2014]. Retrieved from the Internet: <http://www.interplex.com/insert-molding>.

Lebeau, Frédéric; Verstraete, Arnaud; Schiffers, Bruno; Destain, Marie-France. Evaluation of Real Time Spray Drift Using RTDrift Gaussian Advection-Diffusion Model. Communications in Agricultural and Applied Biological Sciences, vol. 74 (1), pp. 11-24. Gembloux Agricultural University, Belgium, 2009.

QJ360 Nozzle Body Series for Dry Boom [online]. TeeJet, 2014 [retrieved on Sep. 25, 2014]. Retrieved from Spraying Equipment Supply on the Internet: <http://www.sprayingequipmentsupply.com/teejet/multiple-nozzle-bodies.html>.

(56) References Cited

OTHER PUBLICATIONS

Sprayer Nozzles for Agriculture and Turf Spraying Systems [online]. Greenleaf Technologies, 2014 [retrieved on Sep. 25, 2014]. Retrieved from the Internet: <http://www.greenleaftech.com/>.
European Search Report in foreign counterpart application No. 15185266.2 dated Feb. 10, 2016.

* cited by examiner

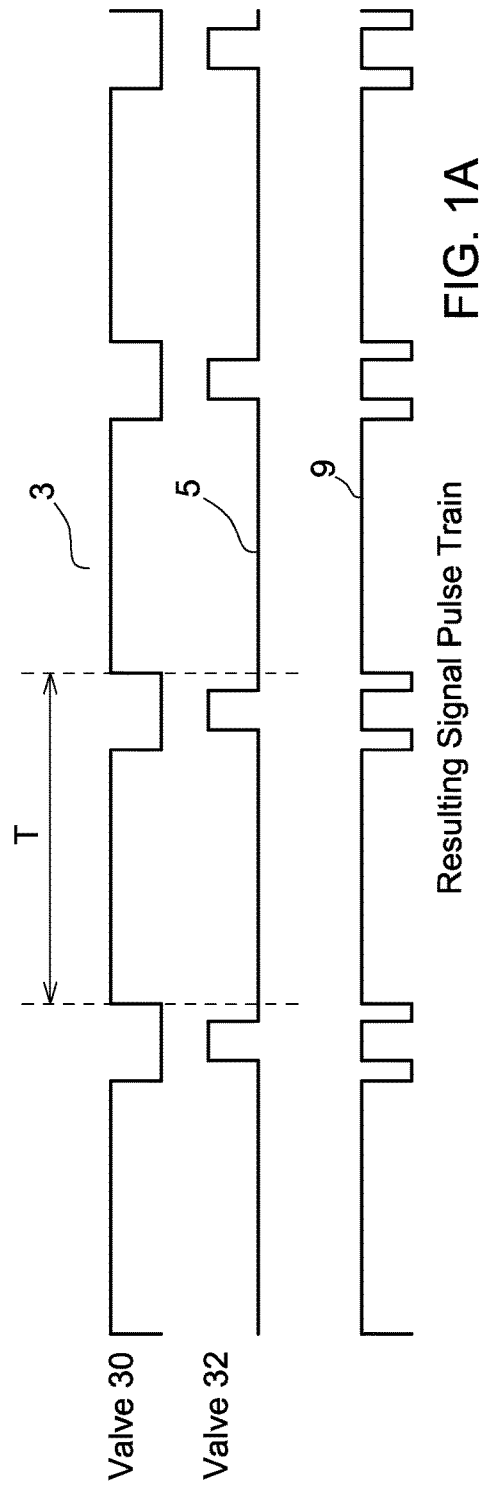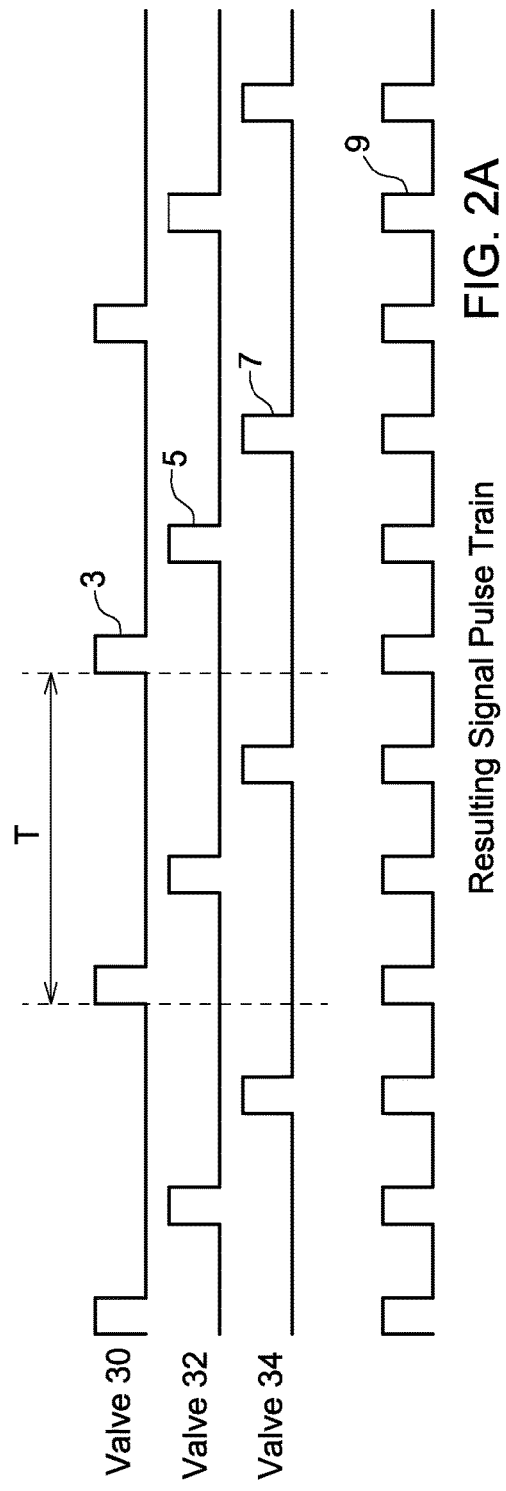

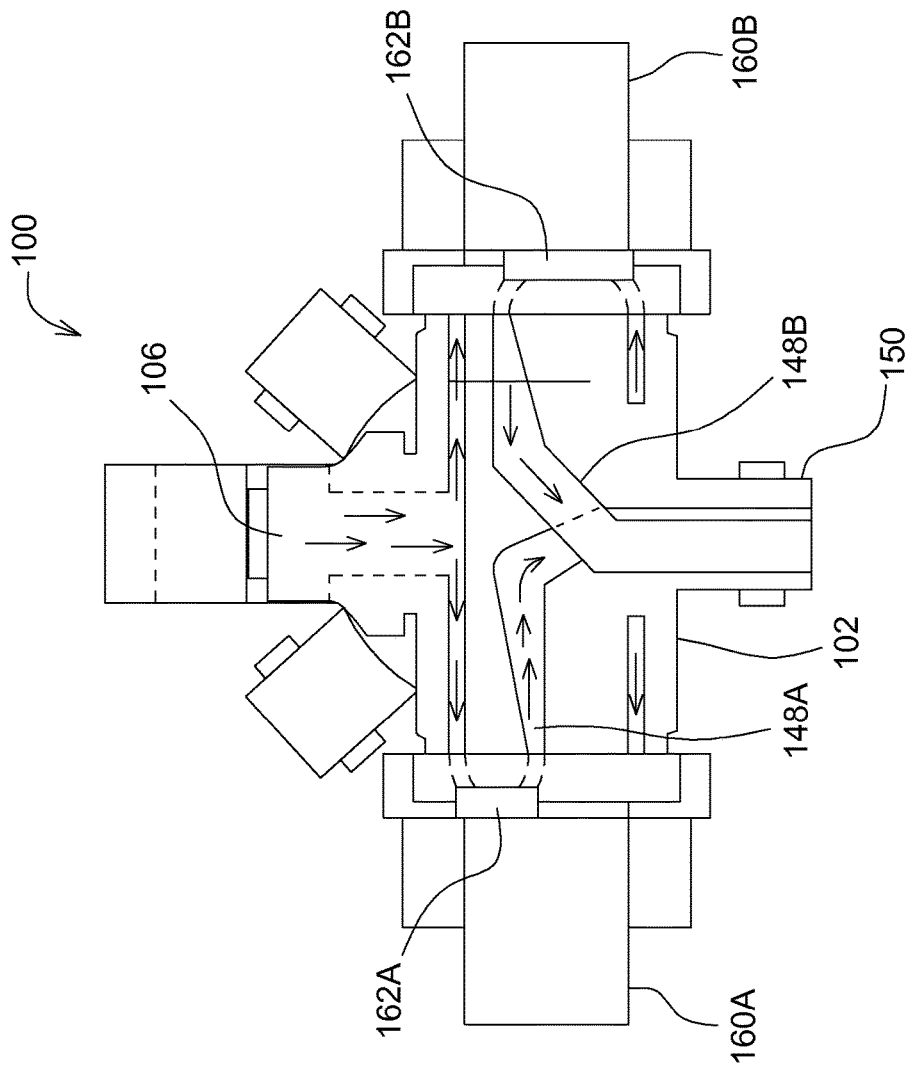
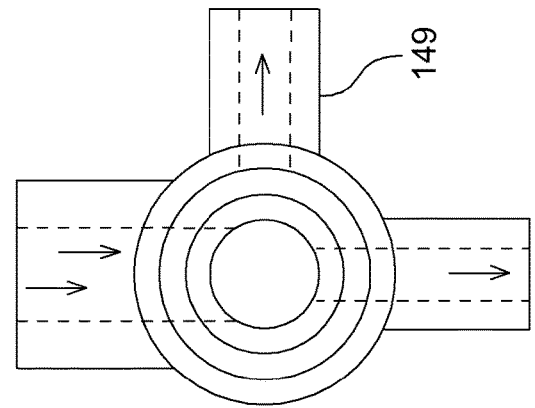
FIG. 7
FIG. 8

BROADBAND SPRAY NOZZLE SYSTEMS AND METHODS

RELATED APPLICATIONS

This patent application claims priority to U.S. Provisional Patent Application Ser. No. 62/015,315, filed Jun. 20, 2014, and entitled, HYBRID FLOW NOZZLE AND CONTROL SYSTEM, the contents of which are incorporated herein by reference. This patent application also claims priority to U.S. Provisional Patent Application Ser. No. 62/050,530, filed Sep. 15, 2014, and entitled, TIME VARYING CONTROL OF THE OPERATION OF SPRAY SYSTEMS, the contents of which are incorporated herein by reference.

FIELD OF THE DISCLOSURE

This disclosure relates generally to the control and design of liquid spraying systems containing spray nozzles.

BACKGROUND OF THE DISCLOSURE

Over twenty-five years ago, a method of using a pulse signal to actuate a valve was introduced to control the flow rate and fluid pressure of liquids through a spray nozzle. Since then, this technique has remained largely the same or unused because it results in spotty spray patterns due to long dead times. The actuator for the valve cannot respond fast enough even if the frequency of the pulse signal is increased; the fluid leaks, which creates problems such as in an agricultural setting (e.g. crops, plants, trees, vegetables, winery), where sprayers are used to apply prescribed amounts of nutrients, herbicides, insecticides and water. In manufacturing settings, sprayers are used to apply coatings of paint colors and layers of chemicals, and ink on surfaces such as plastic, paper, semiconductors, metals, and so on.

SUMMARY OF THE DISCLOSURE

Embodiments include a nozzle body that operates under a time-modulated or a frequency-modulated electronic signal control to release the liquid droplets even at high frequencies. For example, multiple pulse width modulated signals and the ON-state of corresponding valves are interleaved to control fluid flow in a single nozzle. Other features and embodiments are disclosed in the detailed description, accompanying drawings and claims.

BRIEF DESCRIPTION OF THE DRAWINGS

The details of one or more implementations are set forth in the accompanying example drawings, the description and claims below.

FIG. 1A depicts an example timing diagram to operate the nozzle topology of FIG. 1.
FIG. 2A depicts an example timing diagram to operate the nozzle topology of FIG. 2.
FIG. 7 depicts an idealized cross sectional view of a side of an example nozzle tube.
FIG. 8 depicts an idealized end view section of an example nozzle tube.

DETAILED DESCRIPTION

Figure 1:
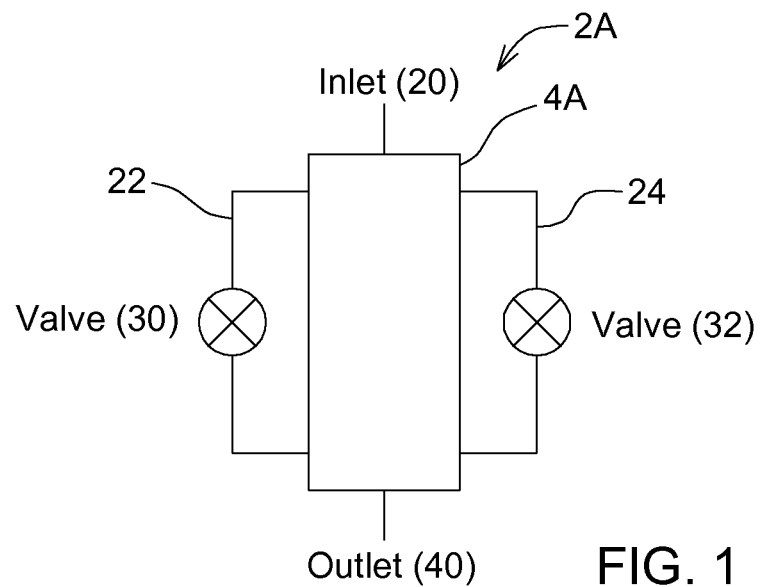
FIG. 1 depicts an example nozzle topology.

It would be beneficial to be able to easily control the spray nozzle to cover a wider range of spray conditions (e.g. pressure, rate control), to eject the fluid either more slowly or more quickly depending on the rate of travel of the spray system, but still uniformly, and accurately. The example embodiments include an electronically wired or wirelessly controlled sprayer nozzle. In one embodiment, multiple pulse width modulated signals are interleaved to control fluid flow in a single nozzle. Such operation speeds up fluid release because single signal operation is often limited by the reaction capabilities of the fluid valves and other equipment. The signals interleave the opening and closing of different valves (or gate or flap) within each nozzle body. Periodic pulse signals or pulse-width modulated signals varies the duration of an applied force that causes the different valves located on or within each nozzle body to remain open or closed. Such interleaved operation of more than one valve increases the frequency at which fluid is transferred from an input to an output of each nozzle, thereby increasing the effective frequency of fluid ejection, or droplets sprayed. But the frequency of operation of each valve is lower so that the valve/actuator still works properly, mechanically. For discussion purposes, the polarity of signals that control when liquid is dispersed from the nozzle is arbitrary, which may be taken as the "ON" state; otherwise, no liquid is dispersed in an "OFF" state.

Interleaved dynamic operation or interleaved opening/closing of the multiple valves increases the effective frequency range of spraying or releasing the fluid from each nozzle body. The disclosed configurations also allow faster changes in the spray rate, more control over the droplet size, prevention of spray drift and skipping (e.g. due to dead time or all-OFF time). The example embodiments also allow finer resolution in the incremental change in flow rate, and maintain nearly constant pressure (to better than 95%) to generate a more uniform droplet size. In some embodiments, even when the duty cycle of a pulse width is below 50%, it is now possible to avoid spray skips while the sprayer is traveling. The spray nozzle embodiments should also readily adapt to erratic motion and terrain, wind conditions, humidity and temperature. Although this disclosure focuses on macroscopic and large sprayers such as those used in an outdoor field, small sprayers and nozzles for industrial manufacturing or even microelectro-mechanical (MEMs) sized sprayers also benefit from these ideas. For instance, industrial uses include a relative motion between a sprayer and the target object that may be irregular in shape or have sharp edges, thus may need rapid changes in the pattern or amount of spray released.

This disclosure first presents the operation and physical configuration of an individual nozzle body or holder using idealized drawings. FIGS. 1-5 show example nozzle topologies 2A-2E for an individual nozzle body that includes at least one fluid inlet, valves to control fluid flow, and at least one fluid outlet. The valves are often located within a nozzle body, or just on the periphery even though the figures depict them as being outside. The outlet(s) are also part of a nozzle body, or just on the periphery; the outlet permits the release of the fluid. The topologies are simplified drawings to aid an understanding of the path of the fluid flow and the operational mechanism. After much testing and design revisions, certain physical implementations were found to work well, as described below.

FIG. 1 depicts an example nozzle topology 2A having a nozzle body 4A with two gates or valves 30 and 32 on paths 22 and 24, respectively. Nozzle body 4A selectively releases fluid and droplets to outlet 40. Nozzle topology 2A receives a liquid input from inlet 20, at least a portion of which flows to outlet 40 as controlled by opening and closing the valves 30 and 32. A fluid can travel either or both of the paths 22 and 24 as controlled by valves 30 and 32, respectively. Outlet 40 attaches to or may physically be covered by at least a turret body, nozzle tip or nozzle cap. Depending on the end-use purpose, nozzle body 4A may be of different shapes, including a hose, a pipe, a sphere, a single nozzle body with holes, or other geometries. FIG. 1 depicts a topology that may constitute an entire nozzle, or it may constitute only a portion of a single nozzle. The configuration of FIG. 1 is integrated into, as part of nozzle body 4E (e.g. left side of nozzle of FIG. 5) so that two valves open and close to transfer fluids from the inlet 20 to a single outlet 40. Moreover, valves 30 and 32 may be identical in design or different.

FIG. 1A depicts an example operation of nozzle topology 2A. Electric pulse signals 3 and 5 are applied to respective actuators (not shown or may be part of the valves) that open and close valves 30 and 32, respectively. For example, the actuator is a plunger-type actuator such as an in-line solenoid valve. Each valve 30 or 32 is opened and closed when an electric current flows through a solenoid (wrapped around a core) that creates an electromagnetic field to propel the core or poppet to move. The motion of the core or poppet pushes or pulls valve 30 or 32 associated with the core or poppet. Alternatively, linear voice coil actuators (e.g. hysteresis free, electromagnetic push-pull actuators), electrical-voltage powered, hydraulic or piston valves are used. Electrical valves include running electric power lines along the length of a spray boom to switch open or close the valve 30 or 32. In this disclosure, the polarity is arbitrarily chosen so that a high value of the signal corresponds to valve open or ON, and a low value of the signal corresponds to valve closed or OFF. In FIG. 1A, during a full period T of operation of nozzle body 4A, pulse signal 3 is ON more than 50% of the duration of period T (over 50% duty cycle), while pulse signal 5 is ON for less than 50% of the duration of period T (less than 50% duty cycle). The duty cycle generally refers to a percentage of time when fluid is released to a target object as compared to a total time of operation. In the example of FIG. 1A, valve 30 is open to let fluid flow for more than 50% of a period T and valve 32 is open to let fluid flow for less than 50% of a period T. The aggregate or resulting signal pulse train depicted in FIG. 1A has a frequency that is two times higher than the frequency of either pulse signal 3 or 5. Fluid droplets are sprayed twice as fast as that of a nozzle body 4A having only one valve operating under a pulse-width modulated signal.

In FIG. 1A, the width of the pulse signals 3 and 5 are fixed; to adjust the flow rate or fluid pressure, the widths are modulated, increased or decreased, depending on the duration and on the polarity (regardless whether open valve corresponds to ON or OFF). Also, for some types of chemicals or paints, a manufacturer specifies the optimal amount of fluid for best coverage. A corresponding fluid flow rate or flow rate range is preselected to achieve the coverage, which often involves modulating the pulse widths to keep within the specified range based on the speed of travel of the nozzle or vehicle to which nozzles are mounted. Further, to create a dithering effect or a more diffuse scattering of the droplets, the duration or frequency of each pulse signal 3 and 5 is varied or modulated rather than be fixed as shown in example FIG. 1A. The volume of fluid transferred or sprayed depends partly on the duty cycle or how long the valves 30 and 32 remain open. The example of FIG. 1A depicts an asymmetric operation and more fluid is released from valve 30 than from valve 32. In this example, pulse signals 3 and 5 are non-overlapping, and they are operating out of phase. If the entire period T is taken to represent 360 degrees, the leading edge of the pulse signals 3 and 5 are approximately 250-300 degrees apart or out of phase. Signals 3 and 5 are generated independently; otherwise, they come from the same parent signal. For instance, if signal 3 is the parent signal, it is replicated, then shifted to generate signal 5; or the leading edge of pulse signal 3 operates on valve 30, and the trailing edge of signal 3 operates on valve 32 (signal 3 is replicated by inversion to present the proper polarity to valve 32). In other examples of operation, the pulse signals 3 and 5 overlap or are more symmetric for more repetitive release of the liquid droplets due to either valve 30 or 32. In yet other examples, the signals 3 and 5 are a sinusoid or ramp rather than a pulse in order to have a more gradual turn on or turn off of the spray droplets or to apply pressure gradually to the valves to open and close them.

In a paint, nutrient, herbicide or pesticide application embodiment where there may be different types of fluids being sprayed, the asymmetric operation of the valves permits achieving different desired ratio of fluids sprayed. When asymmetric fluid spraying is desired, one example possibility is to create a divider in the inlet 20 of nozzle body 4A. The divider (not shown) separates different types of fluids so that they flow into different chambers within nozzle body 4A and then are propelled out of nozzle body 4A, separately, by the action of the respective valves 30 and 32. In other examples, when both fluids are mixed together or sprayed simultaneously, the pulse signals 3 and 5 overlap for at least a part of the duration of period T.

Figure 2:
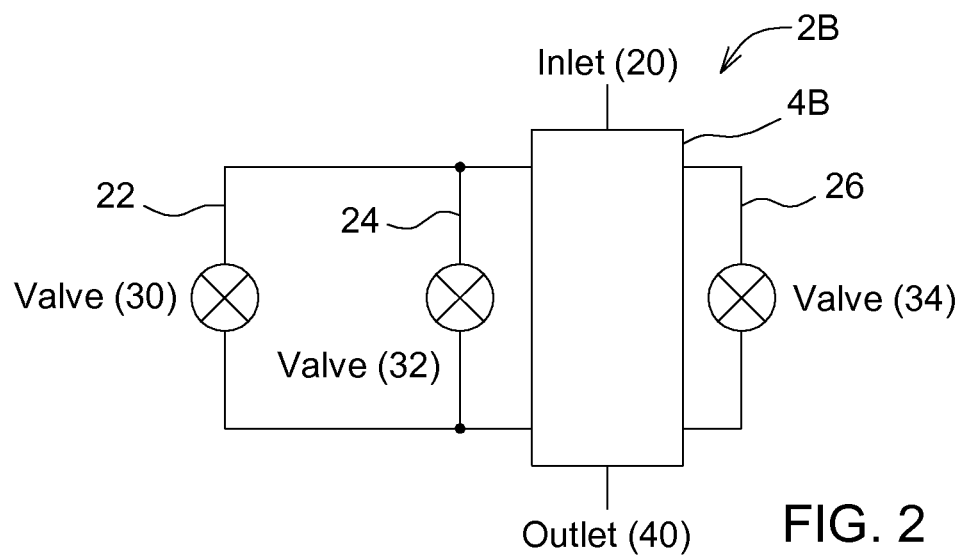
FIG. 2 depicts an example nozzle topology.

FIG. 2 depicts another example nozzle topology 2B having a single outlet. Nozzle topology 2B has a nozzle body 4B with three valves 30, 32 and 34 on paths 22, 24 and 26, respectively, paths that are drawn in parallel in this example. Nozzle body 4B selectively releases fluid and droplets to outlet 40. Nozzle topology 2B receives a liquid input from inlet 20, at least a portion of which flows to outlet 40 as controlled by opening and closing the valves 30, 32 and 34. Outlet 40 attaches to or may be covered by at least a turret body, nozzle tip or nozzle cap. Depending on the end-use purpose, nozzle body 4B includes a hose, a pipe, a sphere, a conventional single nozzle body with holes, or other geometries.

FIG. 2A depicts an example operation of nozzle topology 2B that particularly shows how the frequency of fluid release is increased. Electric pulse signals 3 and 5 and 7 are applied to respective actuators that open and close valves 30 and 32 and 34, respectively. In FIG. 2A, during a full period T of operation, pulse signals 3, 5 and 7 are each ON less than 50% of the duration of period T (less 50% duty cycle); they are ON about 10-20% of the period T and allow fluid to flow through each valve for less than 10-20% of a period T. The ON phase of the pulse signals 3, 5 and 7 are equal in amplitude and duration. The example three pulse signals 3, 5 and 7 are shifted in phase by 100-120 degrees so that the aggregate or resulting signal pulse train depicted in FIG. 2A has a periodic frequency that is three times higher than the periodic frequency of any of the individual pulse signal 3, 5 or 7. Accordingly, fluid droplets are sprayed three times higher frequency than that of a nozzle body 4B having only one valve operating under a pulse signal 3, 5 or 7 alone. To create a dithering effect or diffuse scattering of the droplets, the duration or frequency of one or all of the pulse signals 3, 5 and 7 can be varied (or modulated) rather than be fixed width and fixed frequency as shown in example FIG. 2A. Among other factors, the volume of fluid transferred or sprayed depends on the duty cycle or how long the valves 30 and 32 and 34 remain open. In the example of FIG. 2A, there is symmetric operation and the amount of fluid from the three valves is released uniformly. Since pulse signals 3, 5 and 7 are non-overlapping, the valves are operating out of phase, and if the entire period is taken to represent 360 degrees, the leading edges of the pulse signals 3, 5 and 7 are approximately 115-125 degrees apart or out of phase from the next one (3 from 5, 5 from 7, 7 from 3). In other examples, the pulse signals 3, 5 and 7 overlap or are asymmetric for more overlapping or diffuse spraying of the liquid droplets, respectively. In yet other examples, the signals 3, 5 and 7 are sinusoidal or ramped rather than a pulse in order to have a more gradual turn on or turn off of the spray droplets.

Figure 5:
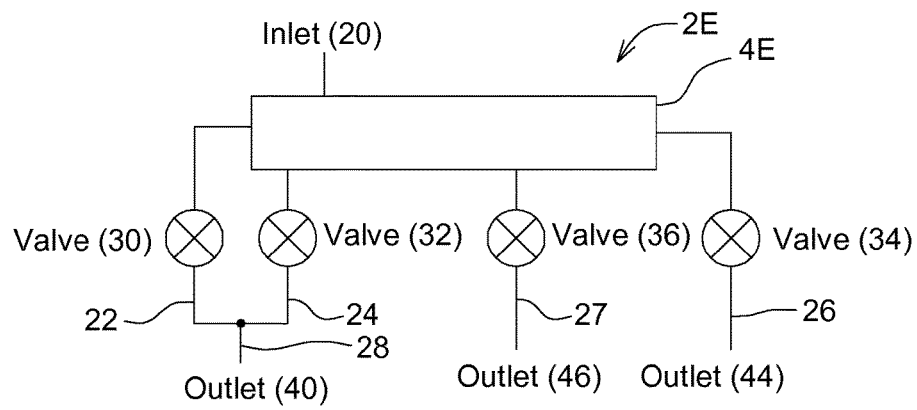
FIG. 5 depicts an example nozzle topology.
Figure 5A:
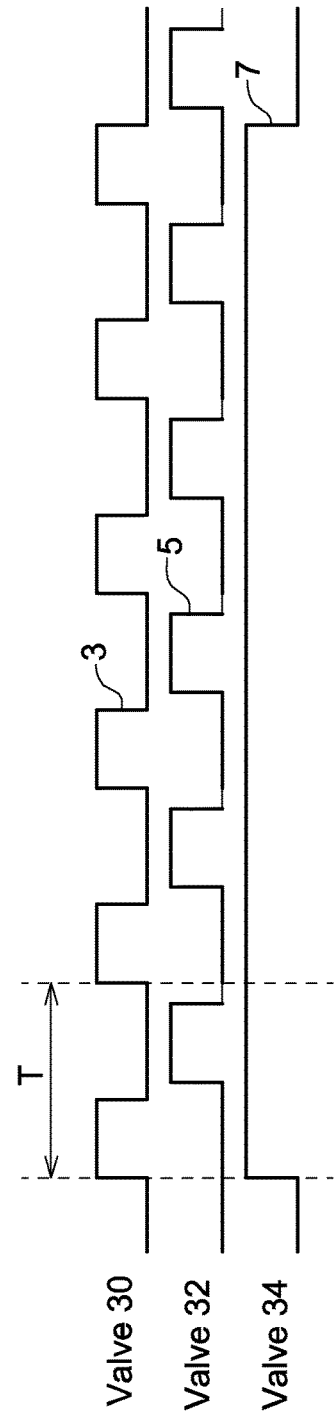
FIG. 5A depicts an example timing diagram to operate nozzle topology of FIG. 5.

In the examples of FIG. 1A or 2A, other possible valve operations include at least some of the signals shown in FIG. 5A. For instance, valves 30 and 32 operate as shown in FIG. 2A, and valve 34 is ON continuously or its frequency of motion is lower or higher than either valves 30 or 32. Moreover, the signals include other forms of periodic or semi-periodic signals such as sine waves rather than pulses to create a more gentle turn on or turn off. Such mixture of operation for an individual nozzle body 4B or nozzle topology 2B is described in the aforementioned provisional patent applications when sequencing through multiple nozzle bodies 4B.

Figure 3:
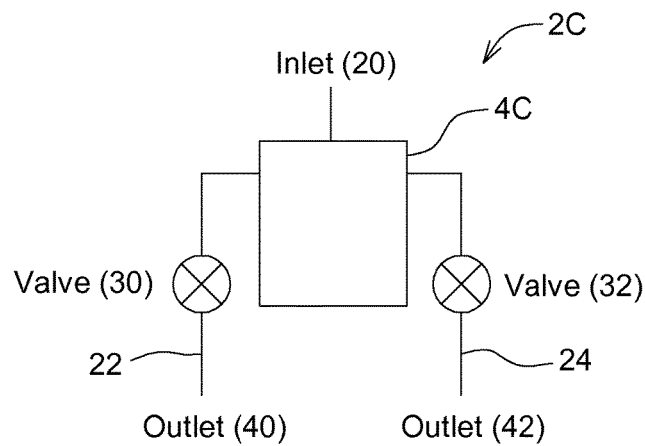
FIG. 3 depicts an example nozzle topology.

FIG. 3 depicts an example nozzle topology 2C having two outlets 40 and 42, at one end of paths 22 and 24, respectively. Nozzle topology 2C has a nozzle body 4C with two valves 30 and 32 on paths 22 and 24, respectively, paths that are drawn in parallel in this example. Valve 30 corresponds to outlet 40 and valve 32 corresponds to outlet 42. Nozzle body 4C selectively releases fluid and droplets to either or both outlets 40 or 42. Nozzle topology 2C receives a liquid input from inlet 20, at least a portion of which flows to either or both outlets 40 and 42 as controlled by opening and closing the valves 30 and 32, respectively. Each outlet 40 or 42 attaches to or may be covered by at least a turret body, nozzle tip or nozzle cap. Depending on the end-use purpose, nozzle body 4C includes a hose, a pipe, a sphere, a conventional single nozzle body with holes, or other geometries.

Figure 3A:
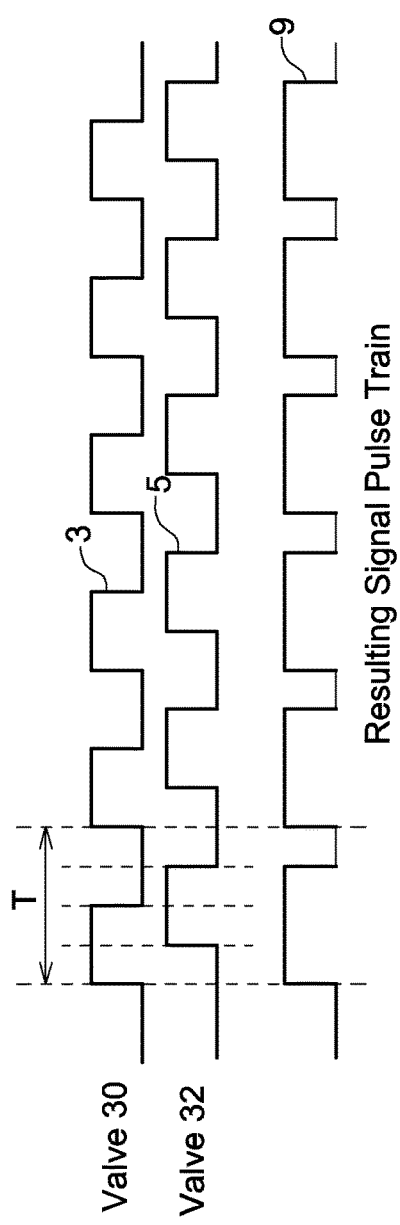
FIG. 3A depicts an example timing diagram to operate the nozzle topology of FIG. 3.

FIG. 3A depicts an example operation of nozzle topology 2C. For instance, the operations include electric pulse signals 3 and 5 being applied to respective actuators that open and close valves 30 and 32, respectively, to propel liquid out of outlets 40 and 42, respectively. Pulse signals 3 and 5 overlap partially within period T. During a full period T of operation of nozzle body 4C, pulse signals 3 and 5 are ON 50% of the duration of period T (50% duty cycle). The phases of pulse signals 3 and 5 overlap each other by about 90 degrees. Fluid is transferred at the same rate from inlet 20 to either outlet 40 and 42, and the fluid droplets are released at the same rate out of outlets 40 and 42, although the release from one lags the other. If the same fluid pressure is maintained as for continuous spraying, the overall volume of fluid sprayed under the control of both valves 30 and 32 as depicted in FIG. 3A would be about 25% less than from continuous spraying, but the spray pattern is more tunable and adjustable to suit an operator's needs.

If the outlets 40 and 42 are pointed towards different spray directions, their associated spray release have the same overlap as operating pulse signals 3 and 5 during a period T. The outlets 40 and 42 release spray independently. During the non-overlapping time durations of signals 3 and 5, only one of the outlets 40 or 42 releases droplets. In the example of FIG. 3A, the leading edge of pulse signals 3 and 5 are shifted by a constant phase within each period T. Alternatively, the width of pulse signals 3 and 5 are varied so that they differ in phase, or in the duration of the ON mode, or in frequency in order to achieve different spray coverage. In another alternative, if the outlets 40 and 42 are pointed toward the same spray direction, the aggregated pulse signal is indicative of the total amount of fluid released to the target area. The aggregate or resulting signal pulse train depicted in FIG. 3A has a pulse frequency that is the same as the frequency of either pulse signal 3 or 5, but the resulting signal has a pulse width that is wider than either pulse signal 3 or 5, alone, so that fluid is released effectively for a longer duration towards the target spray area. In yet other alternatives, one outlet 40 is spraying continuously, while outlet 42 is operated under a pulsed mode PWM or under a frequency modulated control (FM); or both outlets are spraying continuously. In a paint, nutrient, herbicide or pesticide application embodiment where there may be different types of fluids being sprayed, an asymmetric operation of the valves 30 and 32 permits achieving different desired ratio of fluids released from respective outlets 40 and 42. When asymmetric fluid spraying is desired, one example approach is to create a divider in the inlet 20 of nozzle body 4C. The divider (not shown) separates different types of fluids so that they flow into different chambers within nozzle body 4C and then are propelled out of nozzle outlets 40 and 42, separately, by the action of the respective valves 30 and 32. In other examples, when both fluids are mixed together or sprayed simultaneously, the pulse signals 3 and 5 overlap for at least a part of the duration of period T.

In addition to adjusting the time duration or frequency of operation of the valves 30 and 32, the location of the outlets on nozzle body 4C affects the spray pattern. For example, outlets 40 and 42 are pointed in different directions to generate a wider or more diffuse spray pattern; or outlets 40 and 42 are located parallel to each other but offset by a small distance (e.g. less than three inches) and their spray pattern overlaps and covers a more focused target region. Further, to create a dithering effect or a more diffuse scattering of the droplets, the time duration or frequency of each pulse signal 3 and 5 can be varied (or modulated) rather than be fixed as shown in example FIG. 3A. Another possibility is to dither the pulse signals 3 or 5 by adding a randomly generated signal to the pulse signals 3 or 5 in the time domain.

Figure 4:
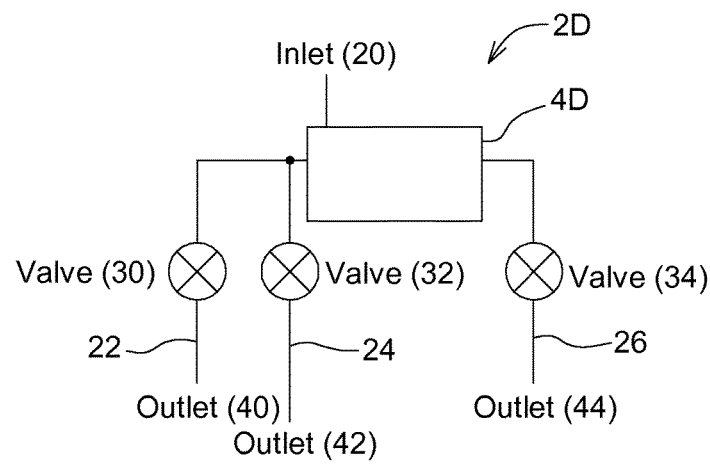
FIG. 4 depicts an example nozzle topology.

FIG. 4 depicts an example nozzle topology 2D having three outlets 40, 42 and 44, at one end of paths 22, 24 and 26, respectively. Nozzle topology 2D has a nozzle body 4D with three valves 30, 32 and 34 along paths 22, 24 and 26, respectively, paths that are drawn in parallel in this example. Nozzle body 4D selectively releases fluid and droplets to at least one of the outlets 40, 42 or 44. Nozzle 2D topology receives a liquid input from inlet 20, at least a portion of which flows to at least one of outlets 40, 42 or 44 as controlled by opening and closing the valves 30, 32 or 34, respectively. Each outlet 40, 42 or 44 attaches to or may be covered by at least a turret body, nozzle tip or nozzle cap. Depending on the end-use purpose, nozzle body 4D includes a hose, a pipe, a sphere, a conventional single nozzle body with holes, or other geometries.

The operation of nozzle topology 2D having three independent outlets 40, 42, 44 includes at least all of the operational possibilities described for nozzle topology 2C having two independent outlets 40 and 42. The third outlet 44 is optionally operating continuously or under pulsed mode or a combination of continuous and pulsed mode.

FIG. 5 depicts a mixed-topology of an example nozzle topology 2E having two outlets 40 and 44, at one end of paths 28 and 26, respectively. Nozzle 2E has a nozzle body 4E with three valves 30, 32, and 34 along paths 22, 24 and 26, respectively, paths that are drawn in parallel in this example. In the arrangement of FIG. 5, paths 22 and 24 merge into path 28 before reaching outlet 40 ("combined" outlet 40). Nozzle body 4E optionally has a third outlet 46 (associated with valve 36). Nozzle body 4E releases fluid and droplets to at least one of the three outlets 40, 44 or 46 depending on which valves are open and on the internal configuration of body 4E. Nozzle topology 2E receives a liquid input from inlet 20, at least a portion of which flows to at least one of outlets 40 or 44 or 46 as controlled by opening and closing the valves (30 or 32) or 34 or 36, respectively. The parentheses around "30 and 32" are in reference to fluid at the outlet 40 being dependent on the action of both valves 30 and 32. Each outlet 40 or 44 or 46 attaches to or may be covered by at least a turret body, nozzle tip or nozzle cap. Depending on the end-use purpose, nozzle body 4E includes a hose, a pipe, a sphere, a conventional single nozzle body with holes, or other geometries.

FIG. 5A depicts an example operation of nozzle topology 2E. The combined outlet 40 nozzle body 4E includes electric pulse signals 3 and 5 being applied to respective actuators that open and close valves 30 and 32, respectively, to propel liquid out of outlet 40. In this example, outlet 44 or 46 or both are releasing fluid continuously or nearly continuously according to electric pulse signal 7. Such a nozzle body 4E provides faster pulse mode operation and extra spray coverage, especially if outlets 40 and 44 (or 46) are positioned to point in the same spray target area. Alternatively, if the spray trajectories of the outlets (e.g. 40) follow one another in the direction of travel of the spray vehicle, this provides more complete spray coverage in the path traveled. In another embodiment, both the combined outlet 40 and the individual outlets 44 or 46 are all operating in pulse mode, whether in phase or out of phase. The spray coverage varies depending on the pointing direction of the outlets, the type of tip on the outlets or filters near the nozzle tip or within the nozzle body 4E, or the shape of the orifices, and so on.

Different scenarios determine whether one or additional nozzle outlets are releasing fluid together in FIGS. 3-5. For instance, if the pressure and fluid flow is above a pre-set threshold as measured by a pressure or flowmeter, an additional outlet releases fluid and all the outlets are operating at a more tolerant fluid pressure (where pressure is often dictated by the delivery of a particular amount of chemical specified to supply sufficient nutrients or herbicide or paint coverage). To change pressure or flow rate, the pulse width of the applied electric signals is varied so that more or less liquid is released. Alternatively, the frequency of the pulses is varied. Another scenario where additional nozzle outlets release fluid involves the use of air induction nozzles together with continuous fluid release rather than pulse width modulated signals, so that more than one outlet is in operation to accommodate different types of nozzles. Yet other scenarios include whether the vehicle is making a turn or re-spraying an area for missed spray spots, which would involve different nozzles to be utilized depending on the desired pattern. For instance, on a turn, the fluid release frequency is correspondingly reduced if the vehicle slows down.

In the configurations of FIGS. 1-5, only one fluid inlet 20 is shown and the fluid is distributed among the different outlets depending on the valve positions and inner configuration of the nozzle body. In another configuration of the topologies, rather than one fluid inlet 20, there are two or more fluid inlets. For instance, in FIGS. 1-5, inlet 20 channels fluid to outlet 40, while another inlet (not shown) channels fluids to output 44 or 46. Such additional inlets permit, for example, mixing different chemicals, maintaining different or similar fluid pressure, separate control of droplet sizes and so on. In one example, two inlets are positioned offset to each other so that different fluid pipes or conduits feed the two inlets.

Figure 5B:
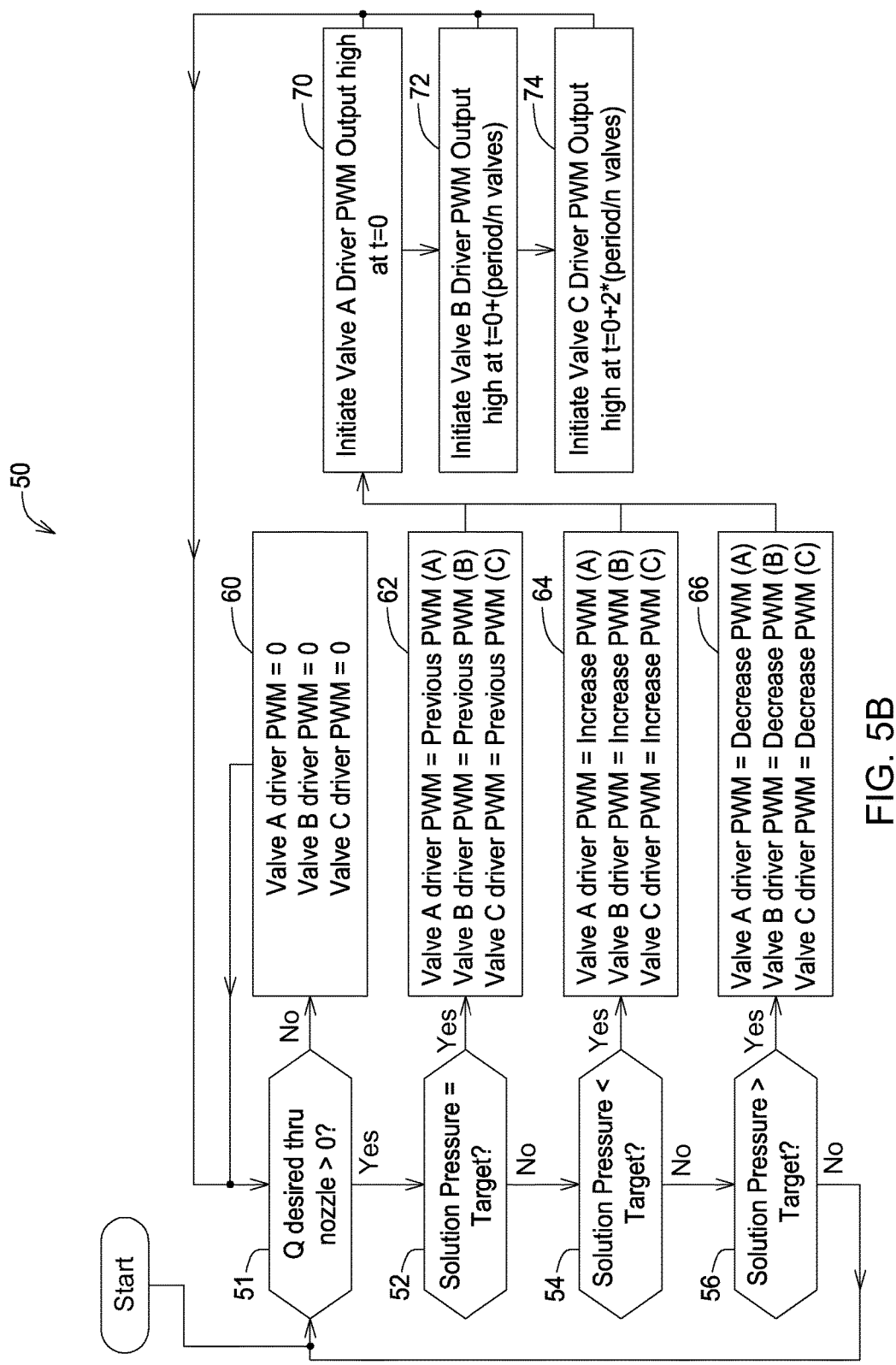
FIG. 5B depicts a flowchart of instructions for a nozzle.

In operation, the valves in the nozzle bodies depicted in FIGS. 1-5 are actuated electronically or hydraulically or electro-hydraulically. Using the example of three valves (e.g. FIG. 2 or 5), FIG. 5B is a flowchart of instructions for any of the nozzles such as 2B or 2E. The instructions reside in the circuits or microcontrollers local to a nozzle 2B or 2E or in central controller such as in the cab of a self propelled sprayer. The instructions are not limited to PWM type signals or to valves only, but the microcontroller executes the instructions to process data from sensors such as the speedometer of the vehicle, wind sensors, and pressure transducers in the fluid pipe distribution, and the microcontroller checks look-up tables to verify if the spray is operating at a desired flow rate or if the fluid flows at a desired pressure.

In the example procedure 50 of FIG. 5B, block 51, the microcontroller or other processing circuit verifies whether the nozzle 2E is ON. If it is not ON, the processing circuit continuously sleeps in block 60 and then wakes up to check whether the nozzle 2E has been turned ON. If nozzle 2E is ON, in block 52, the microcontroller checks if the fluid pressure/flow measurement is within range of a desired value (e.g. according to a fertilizer prescription). If the answer is positive in block 52, the electric signals that operate the actuators remain in the same state as before. If the answer is negative, in blocks 54 and 56, the microcontroller checks by computation or by the look-up table, whether the pressure or flow is too high or too low. If the answer is positive in any of the blocks 52 through 56, then in corresponding blocks 62 through 66, the pulse width (duration) of the signal controlling the actuators is adjusted for the valves to stay ON either the same, longer or shorter, respectively, so as to maintain, increase or decrease the fluid, respectively. If the blocks 52 and 54 reach a negative decision, the microcontroller arrives at the last query block 56, whether the fluid pressure is lower than some preset threshold. If the decision in block 56 is also negative, the microcontroller returns to the beginning of the loop to block 52. Due to jitter or electronic noise, it is possible that none of the conditions (less than, more than, equal to) is satisfied in one traverse of the loop. In some embodiments, hysteresis or windowing or averaging is implemented to avoid none of the conditions being satisfied and to avoid a state of constant looping to verify the status of the fluid pressure. After the microcontroller reaches a result and sets the pulse width of the pulses in block 62, 64, or 66, then one of these blocks sends its modulation values to block 70 to initiate the driver circuits to send command signals to valves. The actual command signals to the actuators for the valves are generated in blocks 70, 72 and 74. In FIG. 5B, the example flowchart applies to three or n number of valves so that there are three or n number of pulse signals to be buffered to the output driver to a particular valve. In this example, the phase difference between the opening of each of the three or n valves is set symmetrically, e.g. 180 degrees apart for two valves, 120 degrees apart for three valves, 90 degrees apart for four valves and so on. Similarly the phase difference between the closing of each of the n number of valves is same the number of degrees apart. The phase difference is set by calculation as depicted in blocks 70, 72 and 74. Using the example timing diagram of FIG. 2A, the PWM pulse signals driving the valves 30, 32, 34 are delayed with respect to one another (the rising edges of the pulses are delayed and do not coincide in time). Returning to FIG. 5B, there are three blocks 70, 72 and 74 because the signals to the valves are generated independently in this example.

Figure 6:
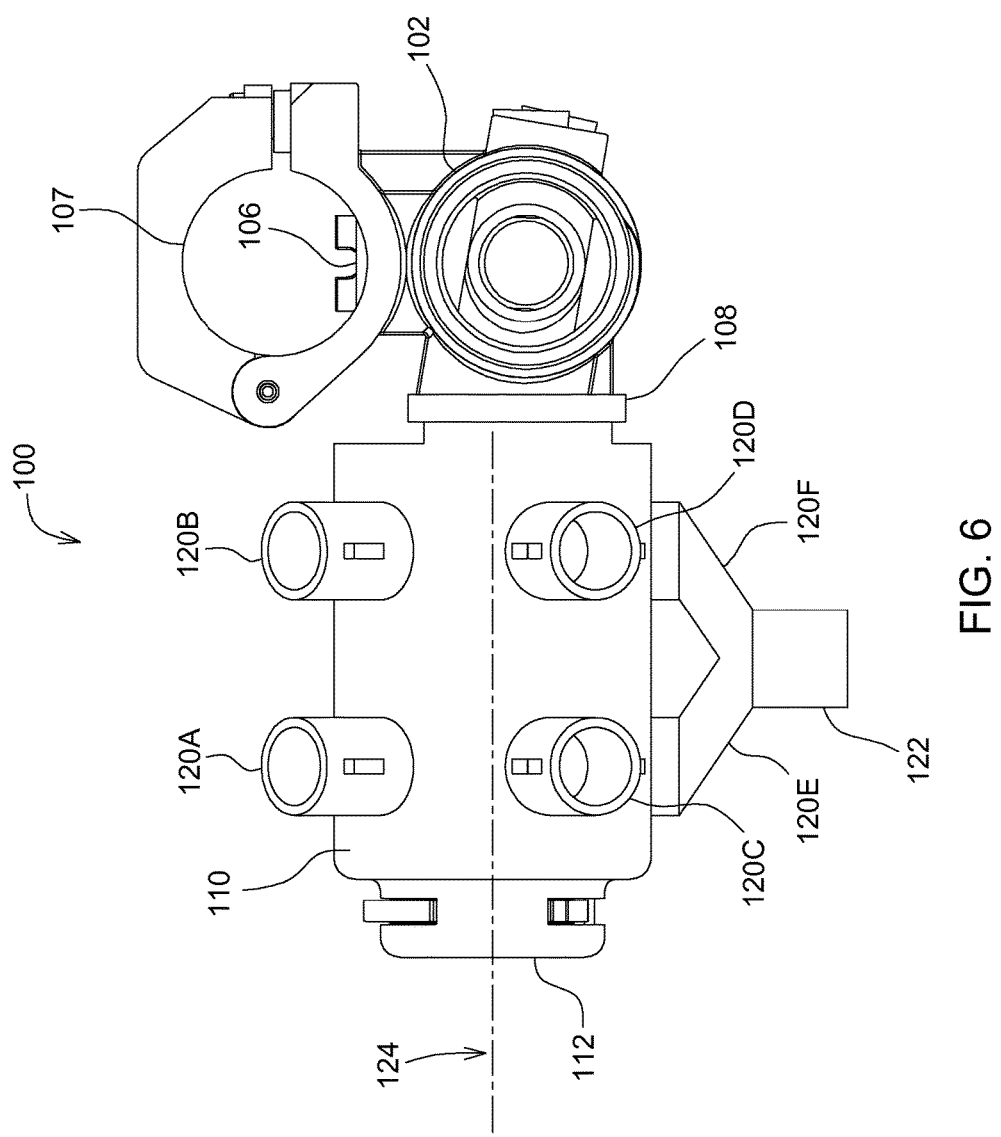
FIG. 6 depicts an idealized drawing of an example nozzle.

The aforementioned example topologies are implemented in physical nozzles such as the one shown in FIG. 6. Example nozzle 100 is used, for example, in an agricultural environment for crops, plants and trees, or in industrial applications for coating. Nozzle 100 has a nozzle tube 102 (end view) surrounding or is concentric about a hole or opening for valve 104A (not shown, protruding out of the plane of the paper). Another valve 104B is located behind valve 104A that is not shown in FIG. 6. Also not shown in FIG. 6 are the devices located outside of the nozzle tube 102 for opening and closing the valves 104A and 104B. For example, the devices include an electromagnetic spring coil, magnetic valves, pneumatic lever, bellows, actuator, and so on, to move valves 104A and 104B. The other end of the opening/closing motion devices includes electrical wires or wireless circuits (with a receiver and power source (e.g. solar or battery)) to communicate with sprayer controller circuits or central controller consoles that determine when to open and close the valves 104A and 104B.

Nozzle tube 102 has an inlet 106 for fluids that is located above nozzle tube 102 in this example. Inlet 106 is located between valve 104A and valve 104B, either symmetrically (centered) or asymmetrically (off centered). If the fluid enters the system from another direction, inlet 106 is oriented in that direction instead. In other embodiments, there are also extra inlets for alternative liquids, for example for spraying different types of plants co-existing in the same field, or for spraying different coatings on a material. Nozzle tube 102 is mounted to a fluid distribution pipe (not shown) having holes positioned along the pipe that mate with the inlet 106 (i.e. so that fluid distribution pipe injects liquids into the inlet 106). For instance, one way to mount the nozzle tube 102 to a fluid distribution system (e.g. pipe) is by inserting the pipe through the circular ring 107 above the inlet 106. Fasteners (not shown) connect the ring 107 to the distribution pipe. The fluid distribution pipe or spray line or "plumbing" inserts into the ring 107. Depending on the span length of the fluid distribution pipe, one to fifteen nozzles 100 hang off and are distributed along the length of the fluid distribution pipe 504 (e.g. FIG. 24).

Nozzle tube 102 also has a nozzle tube output 108 that is positioned approximately 90 degrees counterclockwise from inlet 106, as shown in the example of FIG. 6. The radial orientation of nozzle tube output 108 around the cylindrical surface of nozzle tube 102 may be other than 90 degrees, but instead depend on the application (e.g. location of the target or type of turret), and the location generally does not coincide with or affect the location of inlet 106. At the nozzle tube output 108, nozzle tube 102 connects to an example second nozzle body or segment such as a turret 110 that is akin to a versatile, large nozzle tip. Turret 110 is tubular in this example, but may also be spherical, cubical or some other shape. In the example of FIG. 6, turret 110 has an end cap 112 that in other embodiments includes a fluid outlet instead. Turret 110 is rotatable around its longitudinal axis 124, which permits the selection of different nozzle topologies 2A-2E. The selection is performed either manually or automatically through electronic or remote control. For example, when the turret 110 is mounted on a spindle or rotatable ledge, it easily rotates and locks into a new position via electronic control.

In FIG. 6, turret 110 has multiple types of outputs, individual outlets 120A, 120B, 120C, 120D, 120E, and 120F. In FIG. 6, end-point nozzle tips (not shown) are attached to or caps the outlets 120A-120F; the opening pattern of such end nozzle tips determine or affect the spray pattern, flow rate and droplet size. Although drawn as having the same size in FIG. 6, in other embodiments, outlets 120A-120F are different sizes in order to provide a different spray pattern or to source different amounts of spray; alternatively, the outlets have different strainers inside so as to provide different droplet sizes if the strainers have an irregular or particular hole pattern to serve both as a sieve for debris to avoid plug-ups and as a mechanism to shape the droplets. Outlets 120E and 120F joins together into a combined outlet 122. In other geometries, turret 110 combines or separates fluid flowing through a large single outlet hole that opens to two passageways. The individual outlets 120A-120F are grouped together in pairs or aligned in a row, with each outlet 120A-120F being perpendicular to a center axis 124 of the cylindrical turret 110. Alternatively, if nozzle 100 is an implementation of nozzle topology 2D or 2E, there are additional individual outlets 120A-120F grouped together. Outlets 120A-120F are grouped together in alternative patterns other than as side-by-side pairs, depending on the end-use application and/or on a desired spray pattern (e.g. location of the crops or other targets). However, when outlets 120A-120F are grouped in pairs, the nozzle 100 configuration readily functions as any one or a combination of the nozzle topologies 2C, 2A, 2B, or 2E if the fluid passage inside the turret 110 is correspondingly appropriately configured.

FIG. 7 depicts an example nozzle 100 of FIG. 6, exposing an idealized cross-sectional side view of nozzle tube 102 having passageway of tube ducts 148A and 148B that transport liquids. Alternatively, rather than tubular ducts, 148A and 148B are concentric or off-centered cylinders layered such that liquid may travel between walls of two adjacent cylinders (FIG. 8), and there are tube outlets 149 from one of the walls to a corresponding duct or channel in the turret 110. FIG. 7 depicts example flow patterns showing liquid coming in from inlet 106, splitting and traveling through tube ducts 148A or 148B or between cylindrical walls. The liquid travels to the left and to the right in the particular instance of FIG. 7. The liquid has a return path down to turret ducts or channels, unless its corresponding valve 160A or 160B is closed and blocks the path of fluid flow. For example, plugs 162A and 162B that correspond to fluid walls or valves 160A and 160B, respectively, are actuated by any number or combination of ways to prevent or allow fluid to flow from (spray line) inlet 106 to the turret 110. Actuation mechanisms include local or remote control that allow either continuous or modulated spray flow. For electro-mechanical modulated (e.g. PWM) fluid flow, plugs 162A and 162B are connected to solenoids having open and close positions corresponding to the motion of a steel or iron piece that moves when an inductive coil surrounding the piece has current flowing in one direction or the opposite direction in the coil. The motion of the steel or iron piece provides a mechanical force to open and close plugs 162A or 162B. A controller circuit that is local to the spray line or located remotely (e.g. cab of a sprayer or tractor or at a farmhouse) executes algorithms to open and close the plugs 162A and 162B to operate and eject a particular spray pattern. Alternative actuation mechanisms include hydraulically or pneumatically actuated valves. Other confined and cost effective actuation mechanisms have a speed of operation up to 60 Hertz.

Figure 9:
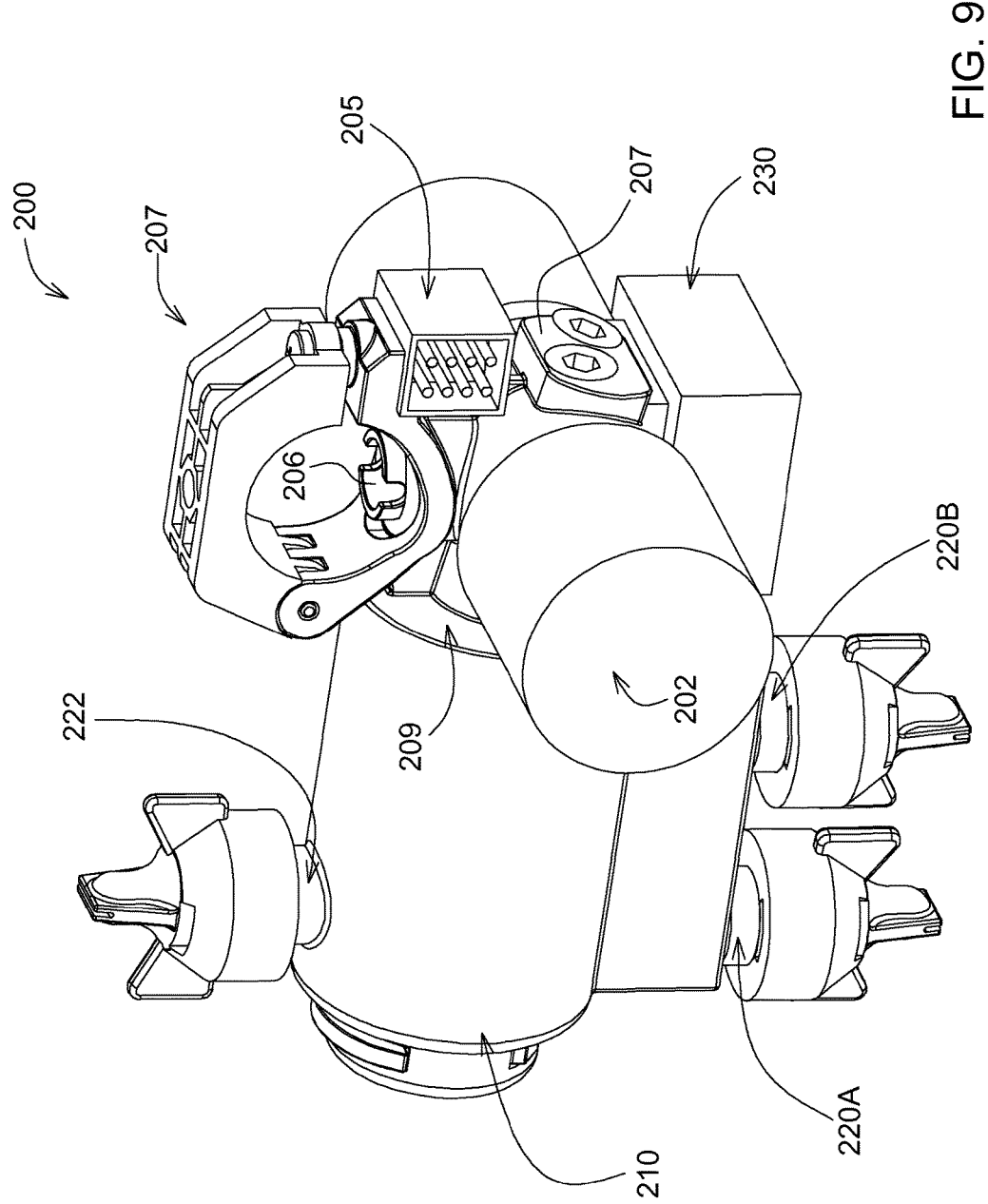
FIG. 9 depicts an idealized drawing of another example nozzle having local circuits.

FIG. 9 is a perspective view of an example nozzle 200 having a nozzle tube 202 that receives liquids at inlet 206 at the top of nozzle tube 202. Nozzle 200 is mounted on a liquid distribution pipe (spray line, not shown in FIG. 9) that is inserted in the mount ring 207 above the inlet 206. The liquid distribution pipe has holes that mate to an orifice or opening of nozzles 200 (at inlet 206) in order to release fluids into inlet 206. Some embodiments include a valve between the liquid distribution pipe and the inlet 206; alternatively, inlet 206 itself includes a valve to prevent or allow fluid flow into nozzle 200. Fluid travels from nozzle tube 202 to turret 210 that is connected to an output of nozzle tube 202.

In FIG. 9, nozzle 200 has example local electronic circuits to control the fluid flow. Nozzle 200 has a turret 210 connected to nozzle tube 202 that surrounds or is concentric or symmetric about a hole or opening for fluid inlet 206. To communicate with the nozzle 200, electric wires that carry CAN-bus communication signals from a centralized boom or nozzle controller (e.g. in the cab) are connected to the electronic leads or pins in receiver housing 205. Signal traces and/or lead frames are printed on small circuit boards mounted inside connector 207 or embedded in a wall of the nozzle body or nozzle tube 202. Plastic and/or epoxy or other insulating material covers the traces to prevent corrosion or electrical shorts. The traces run or connect into circuit box 230 that contains electronic circuits including clock circuits (to control timing), comparators to check if a fluid pressure is over a threshold, buffers to generate pulse signals to the valves, memory circuits to hold look-up tables, logic unit to compute or select the nozzle outlets 220A, 220B or 222, phase lock loop circuits that provide feedback to control and synchronize the performance of different nozzles 200 or nozzle outlets 220A, 220B or 222, electronic noise filters, and so on. In some embodiments, circuit box 230 also contains sensors to detect flow rate, temperature, evidence of plug detection, or other problems. When the sensors detect an over-threshold condition, the circuits in circuit box 230 operate to stop or revise the release of fluid by adjusting the pulse width of PWM signals to the valves. In some embodiments, monitoring sensors are also implemented in the circuit box 230 to provide performance feedback to an end-user, which requires digitizing the analog signals, and transmitting the information to a central controller or computer or cloud data storage device. An alternative to CAN-bus or wired signals is wireless operation using Bluetooth, WIFI or some other wireless protocol. In this alternative, there is no receiver housing 205 or connector 207, but the circuit box 230 contains more circuitry for amplifying and filtering (or removing jitter on) signals and transmitting and receiving wireless signals to and from a remote end-user or controller device. In one embodiment, there is also nozzle selection circuitry that rotates a stepper motor in circuit box 230. The motor rotates a disk 209 on which turret 210 is mounted. Based on a remote or local command signal, disk 209 rotates one or more of the nozzle outlets 220A, 220B or 222 to point to the targeted spray location.

Figure 10:
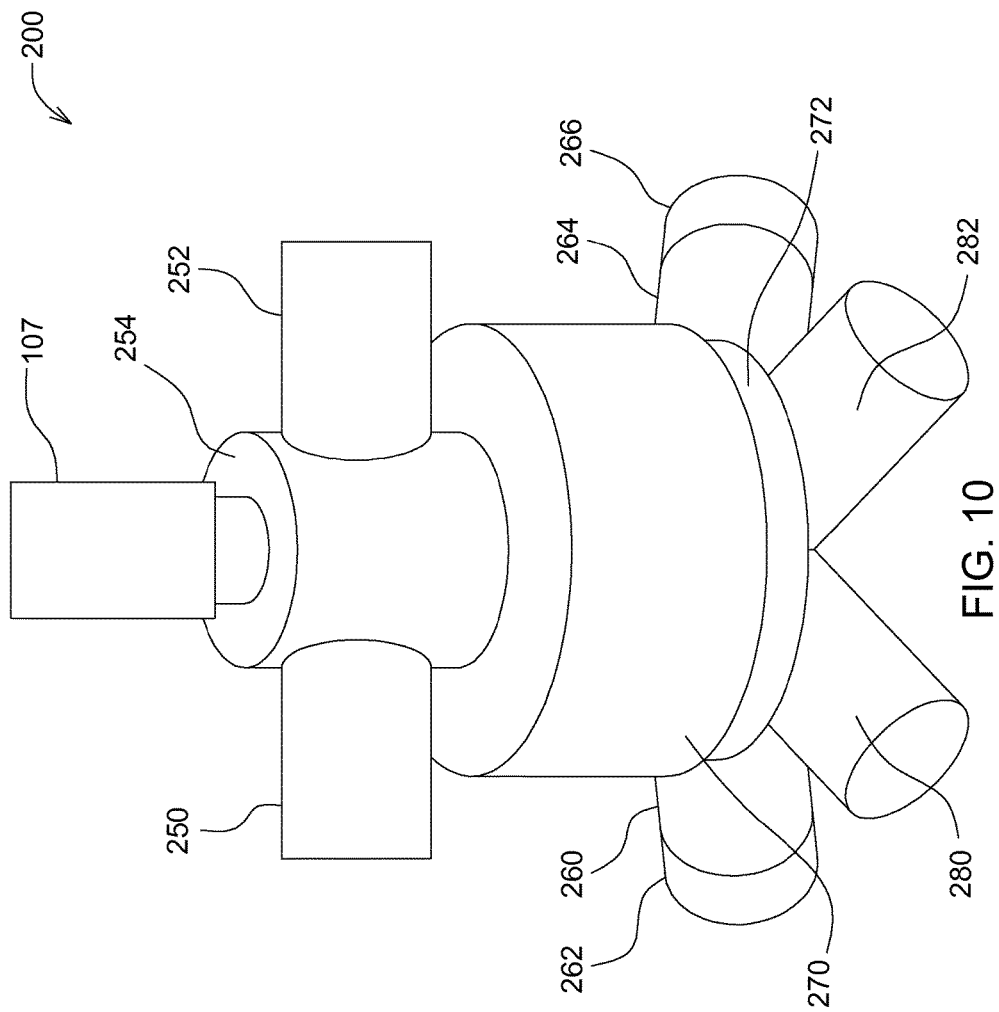
FIG. 10 depicts an idealized drawing of another example nozzle.

FIG. 10 depicts another example nozzle 200 having a nozzle body 270, above which are multiple fluid inputs, input 254 plus at least one additional one 250 or 252 that is perpendicular to or adjoins input 254 so that fluids flows into the chamber for input 254. Although inputs 250 and 252 are depicted as being opposite to each other in FIG. 10, they are closer together or adjacent to each other in other versions of nozzle 200. Alternatively, inputs 250 and 252 adjoin the peripheral wall of the nozzle body 270 and fluid from inputs 250 or 252 flow directly into the main chamber inside nozzle body 270. Input 254 is the main input and connects to a fluid pipe mount ring 107. The nozzle tubes 260 and 264 protrude out of the nozzle body 270. Nozzle tubes 260 and 264 have actuator or solenoid endcaps 262 and 266, respectively, that open and close gates to permit fluid to flow from the inputs 250, 252 or 254 to the main nozzle body 270 and then to outlets 280 and 282. Turret 272 is rotatably attached to the nozzle body 270 and nozzle outlets such as 280 and 282 are mounted to and located on the outer bottom of turret 272. Although depicted as protruding at an angle with respect to each other, outlets 280 and 282 are pointing in the same direction in other versions of nozzle 200. Outlets 280 and 282 are either combination-type outlets that receive fluid from more than one inlet (250, 252, 254) or single outlets. Turret 272 is manually rotatable (clockwise or counterclockwise) with respect to nozzle body 270. Alternatively, turret 272 is attached to an electrically-operated plate or turntable and automatically rotated based on a command signal sent to the plate (e.g. stepper motor); and a spindle or central shaft of the plate is driven by a motor to rotate on command, mate the inputs to the outlets 280 or 282, and position a selected nozzle outlet 280 or 282 to a desired spray direction.

In an example operation, each nozzle 100 or 200 has circuits to control and monitor its own performance. In a situation such as agricultural vehicles, the cab of the vehicle has a centralized computer operator or there is a remote operator who selects control options on a screen from his computer that are relayed to and translate into commands and data transfer to and from the local nozzle 100 circuits. In the example signals 3, 5 and 7 in FIG. 2A, the local circuits generate the three signals independently within a time period T. A clock divider generates clock ticks based on the leading edge of the time period T. At the start of period T, signal 3 is generated; at T/3 signal 5 is generated; at 2T/3 signal 7 is generated. For even number of signal pulses, e.g. the signals 3 and 5 are readily generated by triggering off of the leading edge of period T for signal 3 and the falling edge of T for signal 5. Alternatively, the signals 3, 5 and 7 that control the valves in a nozzle tube are generated sequentially. A pulse edge of T generates signal 3; the falling edge of signal 3 triggers the generation of signal 5; the falling edge of signal 5 triggers the generation of signal 7. Regardless whether the signals 3, 5, 7 are generated independently or causally, the time delay between signals and the pulse width of the signals are varying or modulated based on the desired target spray rate or pressure (pressure versus spray rate) for a particular speed of the vehicle and environmental conditions (e.g. wind and terrain).

Figure 11:
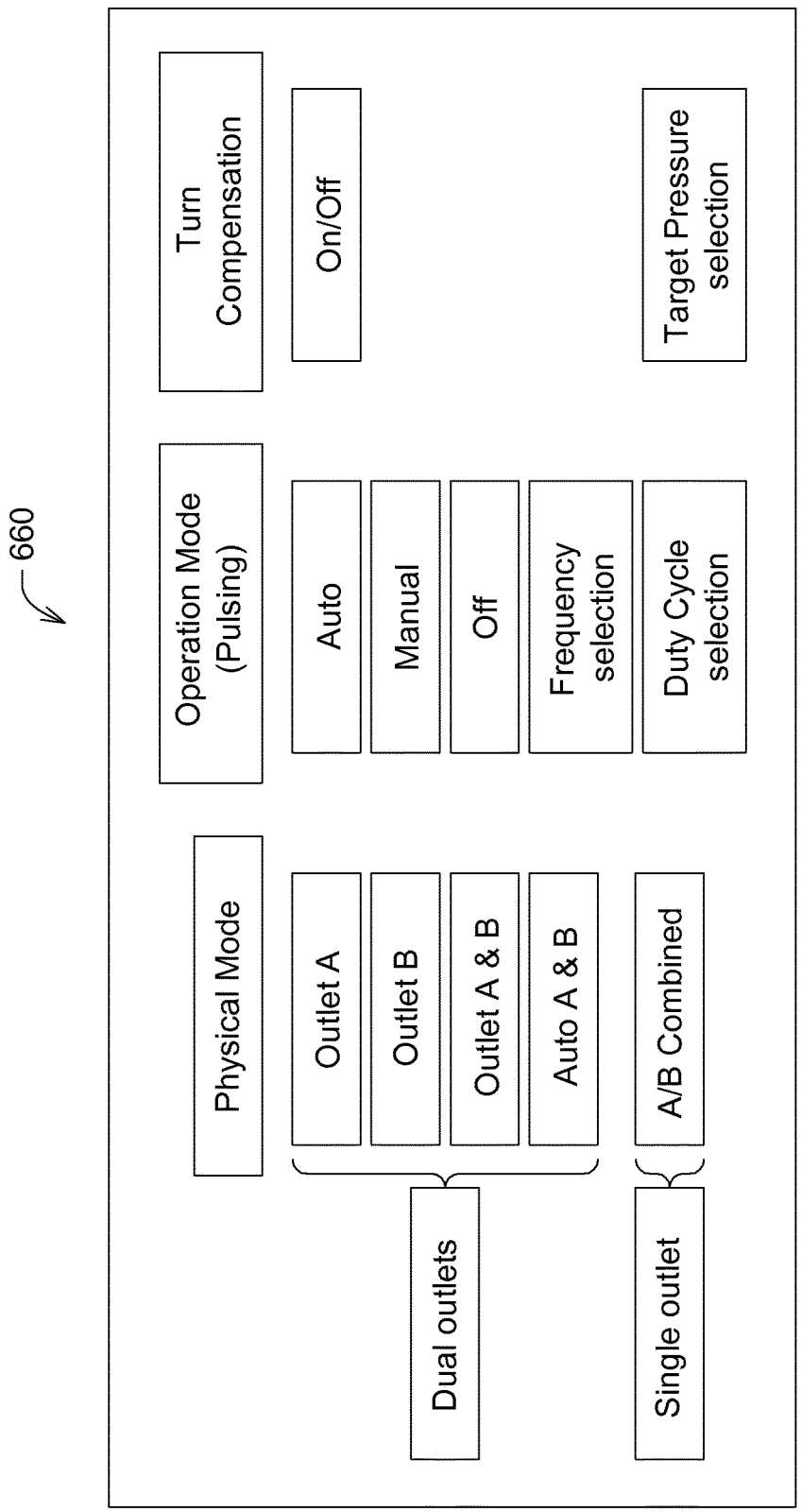
FIG. 11 depicts example touchscreen for nozzle control.
Figure 12:
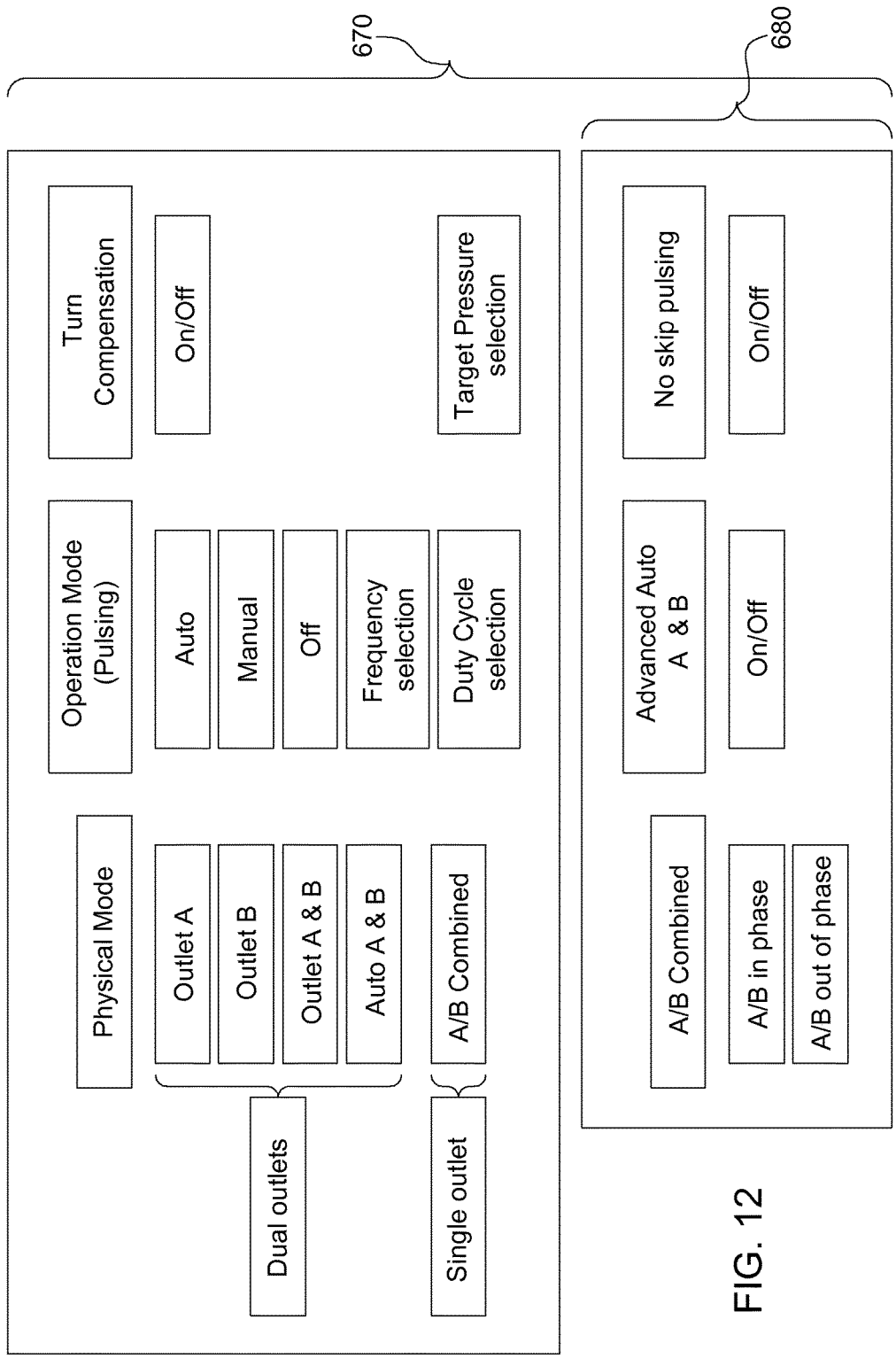
FIG. 12 depicts example touchscreen for nozzle control.
Figure 13:
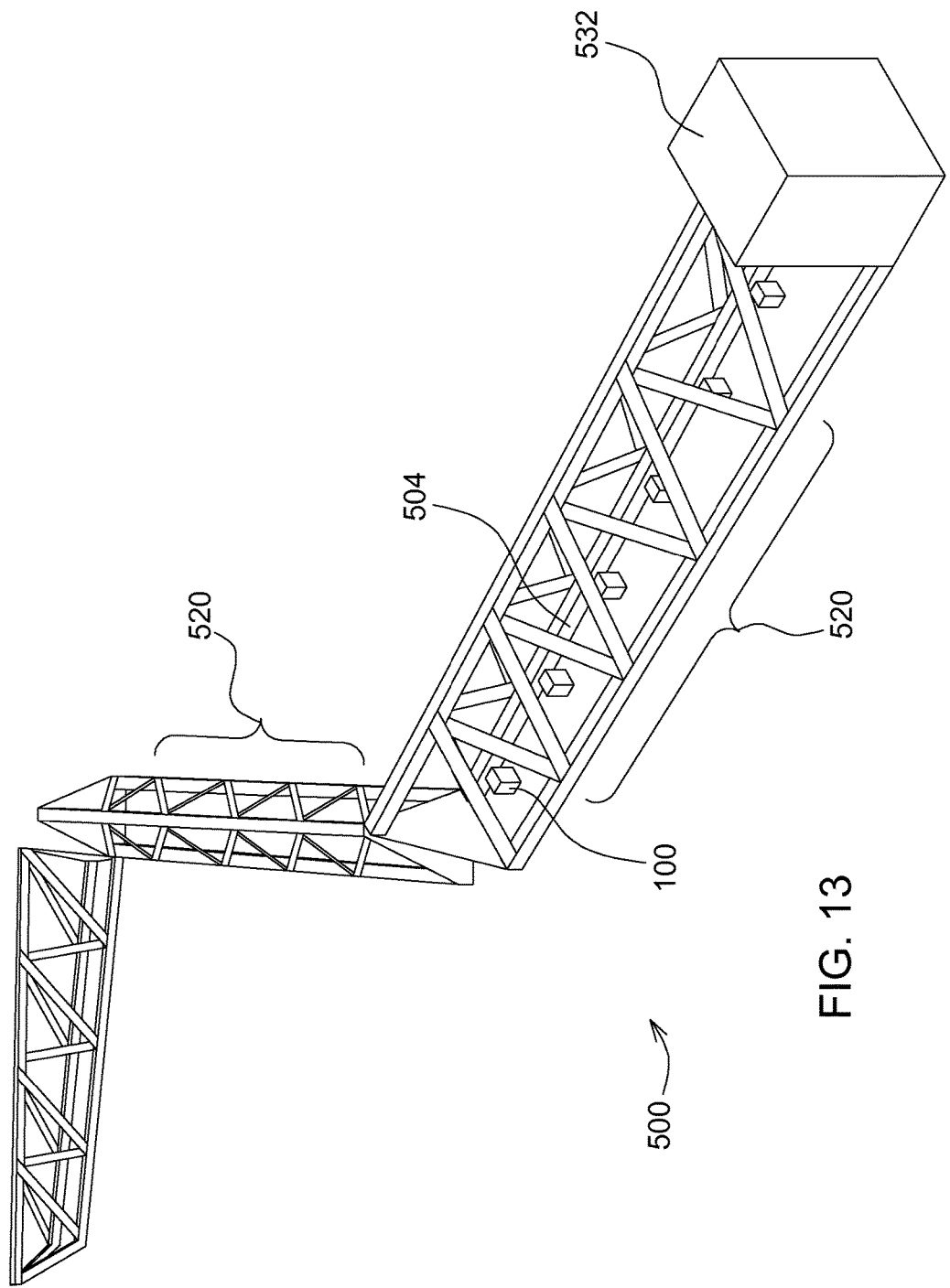
FIG. 13 depicts example nozzles mounted on a sprayer boom or arm.
Figure 17:
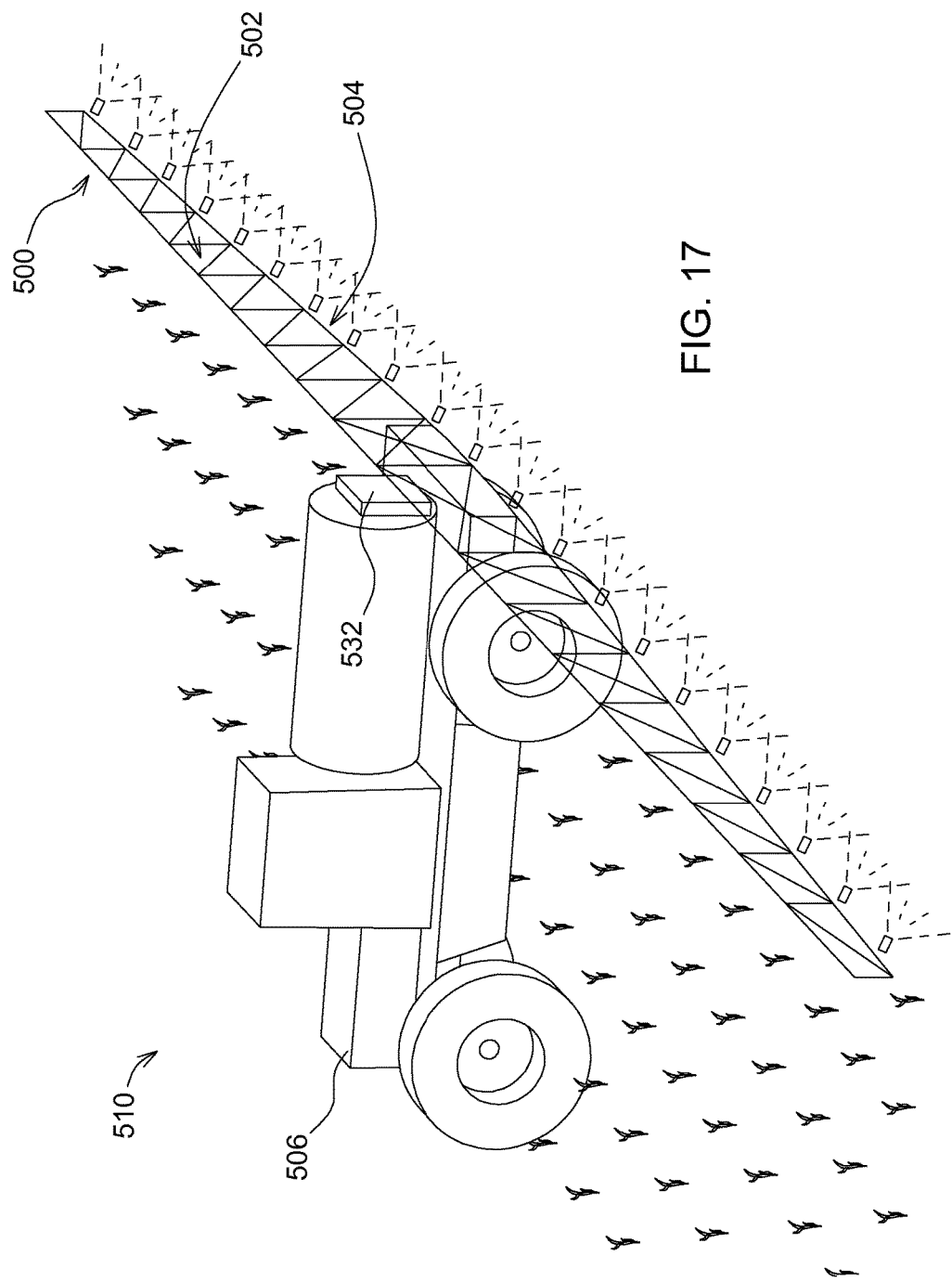
FIG. 17 depicts an agricultural vehicle having a sprayer boom on which the example nozzles are mounted.
Figure 18:
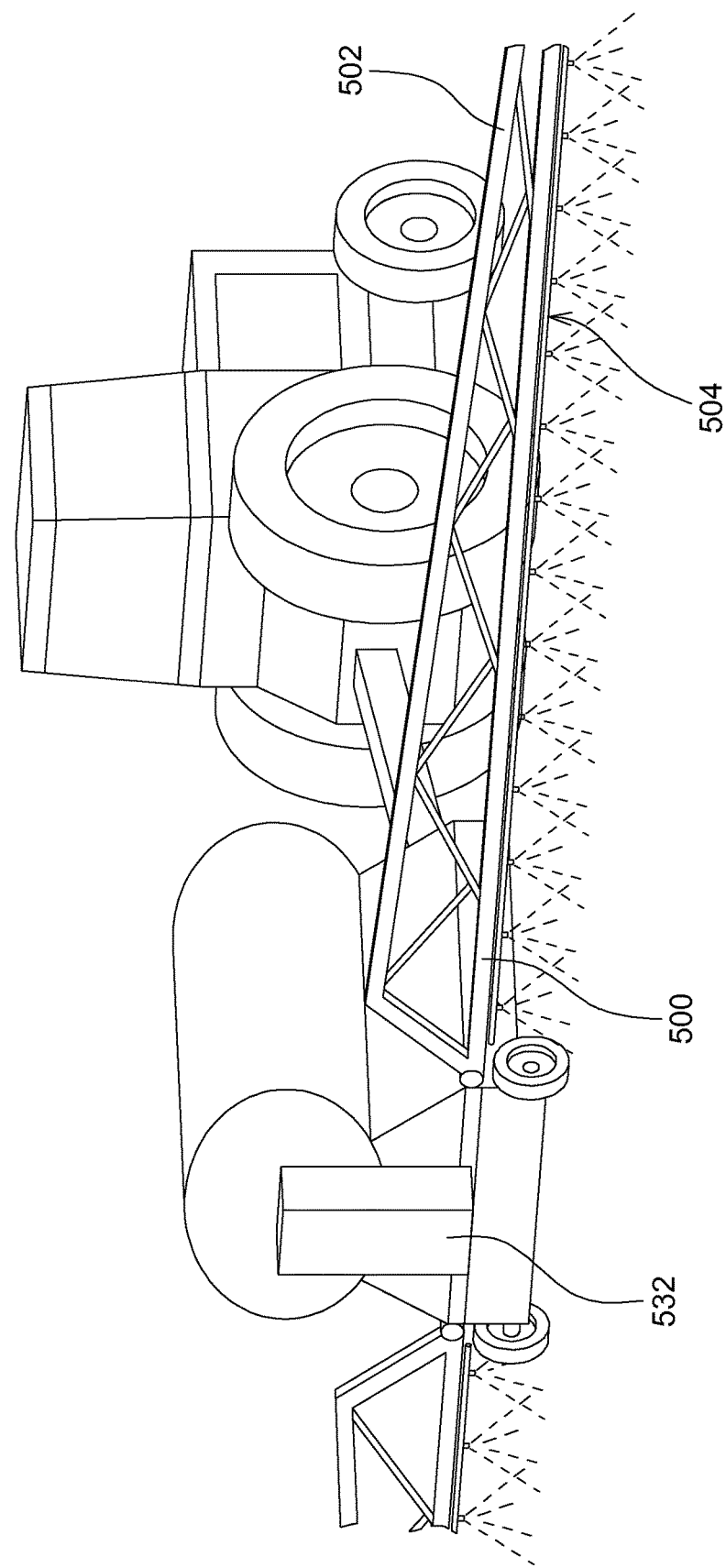
FIG. 18 depicts an agricultural vehicle towing a sprayer boom on which the example nozzles are mounted.
Figure 19:
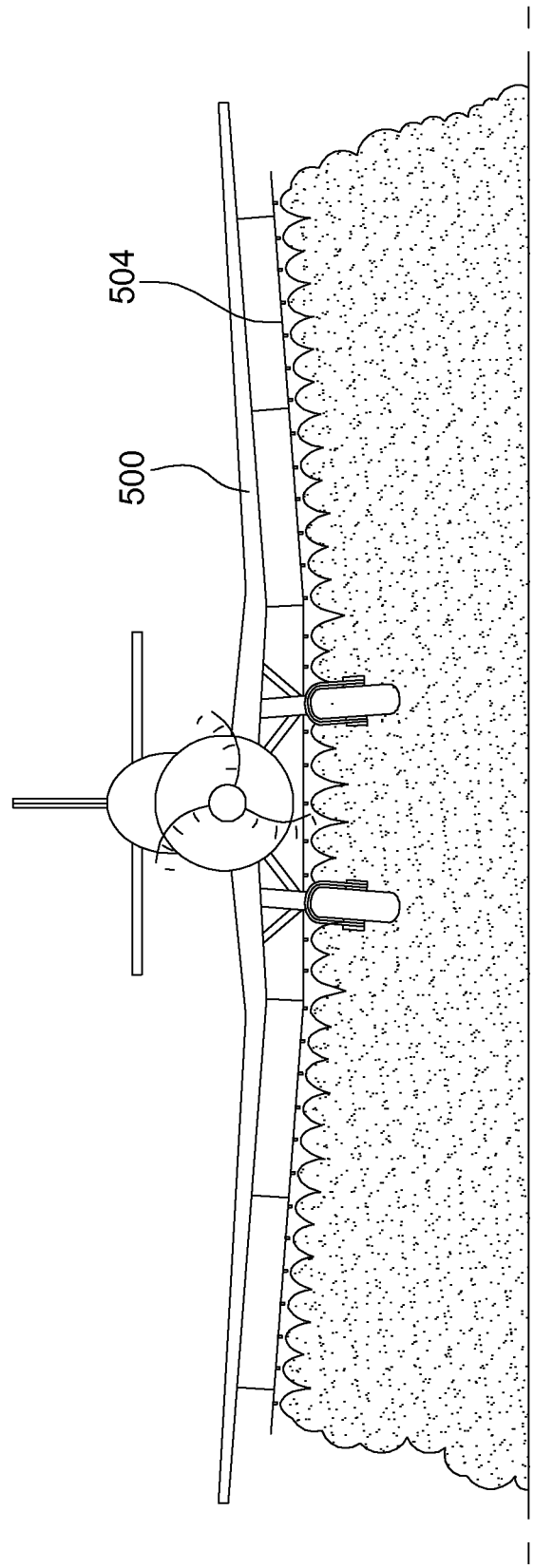
FIG. 19 depicts an air vehicle having an attached frame on which example nozzles are mounted.

An example touch screen display page is depicted in FIG. 11. From the central computer screen (e.g. FIG. 11), the operator selects features such as the spray nozzle being ON or OFF and the rate of spray application (e.g. through touch screen or remotely with a key fob (frequency operated button)). The operator also selects whether to run the nozzle bodies (e.g. 4A) in PWM mode or continuous mode or some combination. For PWM mode, the operator can choose the frequency of operation of the valves, the duty cycle of the pulse width, and whether to spray out of one or multiple nozzle tips from each nozzle body 4A. Alternatively, the operator can select a target spray pressure that causes the computer to compute or to look up a desired nozzle body 4A spray configuration that will achieve the particular spray pressure. In an alternative touch screen configuration as depicted in FIG. 12, there are additional touch screens such as for the operation of a physical embodiment of nozzle topology 2A as shown in FIG. 1, or outlet 122 in FIG. 6, where two or more ducts empty into a single combined outlet. On the touchscreen of FIG. 11 or 12, the operator selects whether to open and close the two nozzle valves (e.g. 30, 32) in phase or out of phase. Additional selections include No-skip-pulsing where the two valves are operated both on PWM and there is a third valve that continuously releases fluid. Another option is that one valve is operated on PWM and another one remains open continuously to release fluid to an outlet (e.g. 40).

In further operation, there is usually more than one nozzle body (e.g. 4A) so that a master spray controller or central computer is used to coordinate the activities of different nozzle bodies 4A. In one embodiment, the master spray controller is mounted to the spray-boom center frame or suspension electronics portal (not shown). The master spray controller addresses each nozzle body 4A and performs the functions of an interface for each nozzle body 4A to the CAN bus, controlling collective activity such as synchronization of spray performance by sending a master clock to each nozzle body 4A, providing turn compensation (reducing spray), and coordinating needs such as power management. In addition, either the master spray controller or a local nozzle processor or micro-controller circuit meters out the amount of spray by modulating the pulse width that controls the ON state of a nozzle body 4A. In one embodiment, the target spray pressure or spray rate is a priori calculation based on information such as a particular speed of vehicle travel, wind compensation, type of chemical (manufacturing specification as to the dosage per acre). The pre-calculated information is entered into a look-up table stored in the local processor or central computer's memory in order to serve as a comparison basis with the instantaneous or averaged dynamic values of a nozzle body 4A (vehicle) in motion. When the instantaneous/averaged values surpass the pre-calculated information, the valves 30 and/or 32 are set to an OFF state to prevent further spray release. Alternatively, using the computer's logic processor circuit, a pre-programmed equation dynamically determines (calculates and corrects for errors) the amount of spray to be released based on vehicle speed and other variables, or a calculation is used jointly with lookup table entries to determine an appropriate amount of spray release.

To start the operation of the spraying, a nozzle body 4A is turned ON to spray mode in a number of alternative ways. A fob or remotely controlled signal indicates to the central computer or the operator commands the computer to proceed, in which case the computer buffers out an electronic signal to interface circuits that generate signals using CAN-bus compatible protocol to a master spray controller. Alternatively, an operator in a vehicle towing the spray nozzles bodies 4A touches a screen or sets a manual lever to turn the spray nozzle bodies 4A to the ON state such as in a Combined A/B PWM mode (e.g. FIG. 11). Then fluid travels through inlet 20, fills an orifice, splits to either side of the orifice towards valves 30 and 32. If both of the valves 30 and 32 are closed, the fluid does not travel any further. Otherwise fluid is released to outlet 40.

After much testing it was found that by including two or more closing (open and close movement) valves to direct the fluid flow from one chamber of a nozzle body (e.g. 4A) to another chamber, along with the use of PWM or continuous flow control (e.g. to increase frequency), the example nozzle bodies 4A then have enough flexibility of operation so as to be compatible with a multitude of boom designs, and either lightweight or heavier boom designs. Examples of booms 500 include those with a truss 520 structure such as shown FIGS. 13 and 14. Other boom embodiments include a suspension 530, segmented tube, as shown in FIGS. 15 and 16 that are suspended from a sprayer center frame 532 boom mount, like a suspension bridge with cables emanating from the main (primary) post to the deck beams. Tubular booms without sufficient braces or trusses 520 tend to flex more so that faster spray release such as from nozzle body 4A compensates for any increase in vibration from the boom that disturbs the spray pattern. Alternatively, since nozzle body 4A can release spray faster or slower and is tunable (modulation), its performance can be optimized (tuned) to be more compatible with the motion of the boom. By modulating and having multiple options for the outlets, the dynamic performance of nozzle body 4A covers a wider range of possible performance (e.g. to accommodate a wider range of pressure, flow rate, angle and spray area). For embodiments with lighter weight booms, a sprayer can instead carry more weight in other ways such as through more application material or fluids. For example, a larger tank can be used or a second spray tank is optionally mounted or docked on the spray vehicle to accommodate more spray material. The additional amount of fluids/chemicals sustains a yet faster spray rate or higher flow rate that can be accomplished by the interleaving of PWM signal controlled valves for nozzle bodies 4A.

FIGS. 13 and 14 depict nozzle bodies (e.g. 4A) mounted on or clamped to a boom assembly 500 that is in turn mounted on a dolly platform, or a vehicle such as a tractor or self propelled sprayer (e.g. FIGS. 17-19). The hosing (not shown) that carries the fluid are mounted externally to or located internally to the boom assembly 500. Alternatively, the vehicle includes an aircraft (e.g. FIG. 19) for aerial spraying or hand-operated or lever-operated knapsack sprayers. Tractor 510 type spraying include low-pressure (e.g. 20-50 psi) sprayers that apply about 5-50 gallons per acre. Other tractors 510 include tractor-mounted spray machinery (e.g. tank, pump or flow regulator driven by a hydraulic motor or compressor. Boom assemblies 500 are mounted in the front, rear or one-or-both sides of the tractor 510. In alternative embodiments, tractor 510 mounted sprayer units are combined with other equipment such as planters, cultivators or tillage implements. Nozzle bodies 4A can be mounted to the ends of a row crop drop that would enable the nozzle bodies 4A to spray lower, nearer to the crops, especially after the crops have just emerged. By contrast, FIG. 17 depicts a high-clearance sprayer tall enough to clear the height of taller crops such as corn. Mounted on either the front or the back of a vehicle, the spray boom assembly 500 is lowered or raised, depending on crop height and application conditions. Alternatively, FIG. 18 depicts a trailer-mounted sprayer attached to a wheeled liquid tank and towed through the field by a tractor or a truck or other utility vehicle. Tank capacity ranges up to 1000 to 1500 gallons; a pump is mounted on tractor 506 and driven by a tractor PTO shaft or other hydraulic motor. For industrial applications, nozzle bodies 4A are mounted to a boom or to individualized fluid pump holder so that there may be only one nozzle. Nozzle body 4A can be used for boomless broadcast spraying for either agricultural or industrial spraying, or even for manually operated or handheld spray systems.

Figure 14:
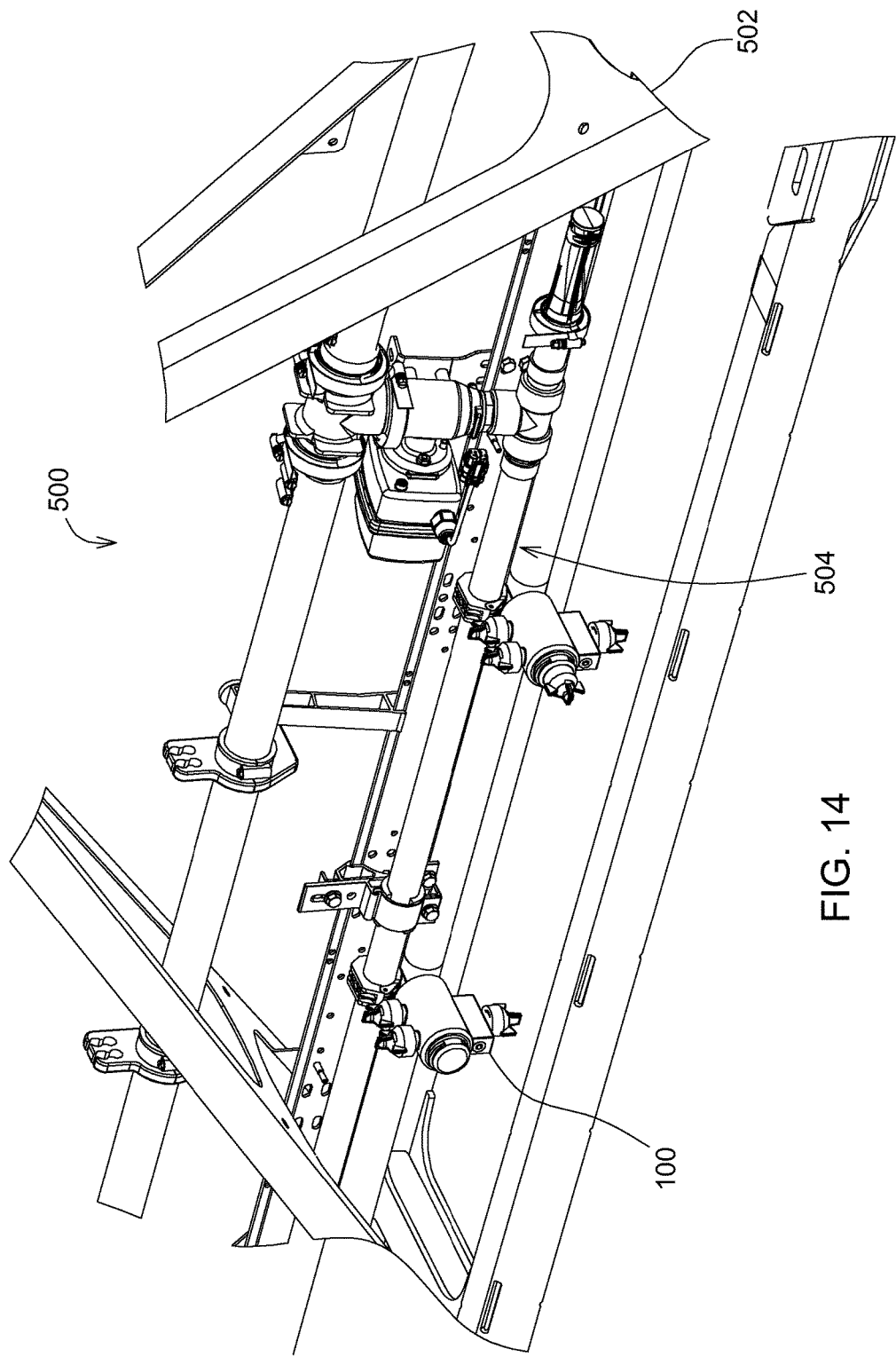
FIG. 14 depicts example nozzles mounted on a sprayer boom or arm.

In FIG. 14, the boom assemblies 500 have a "wet" boom or spray line 504 to which a plurality of nozzle bodies (e.g. 4A) are attached; the spray line 504 supplies fluids to each of the nozzle bodies 4A that are spaced apart by 5-20 inches distance, depending on the amount of desired spray overlap. Depending on the size of the boom and fluid pipes, the number of nozzles range from 20 to about 120. In other embodiments, nozzle bodies 4A are attached to a "dry" boom, where hose carry fluids to each nozzle. Like the nozzles, the boom assemblies 500 or their elements such as the spray line are made in a variety of styles (FIGS. 13-16, with or without trusses 520 and different folding mechanisms) and comprise materials such as steel, aluminum, alloys, a composite, carbon fiber, flax fiber, rubber, fiberglass, polymers, plastic, combination of these materials and so on. Rivets and connectors that hold together the boom 500 segments, struts 502, channels, are often metallic but may also be of man-made materials. Rivets and connectors or channels made of heavier material such as alloys and metals are sometimes added also to act as weights to stabilize boom assemblies 500 made of lighter material.

Figure 15:
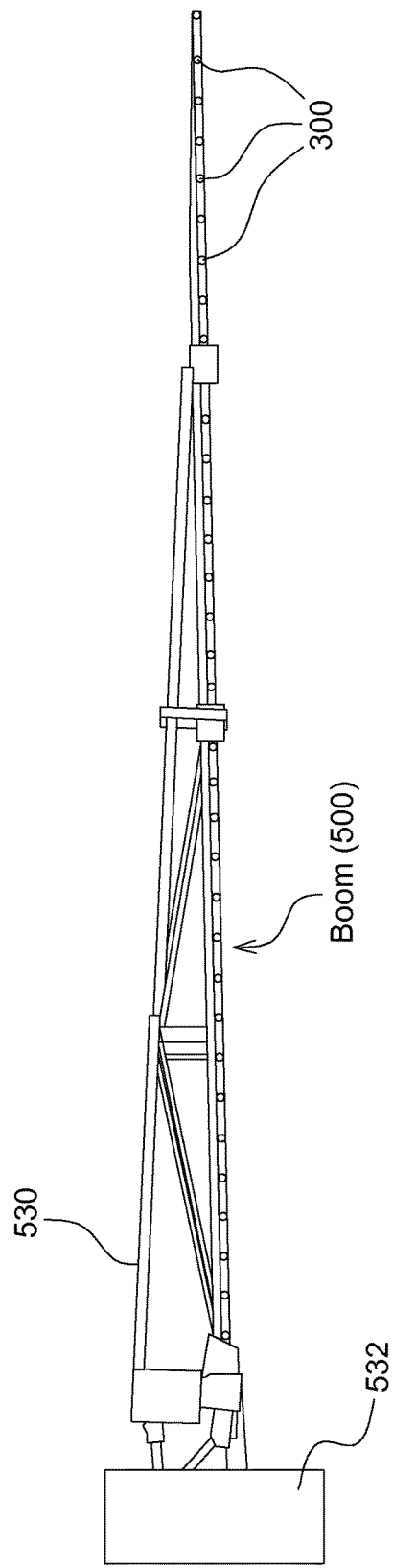
FIG. 15 depicts example nozzles mounted on a sprayer boom or arm.
Figure 16:
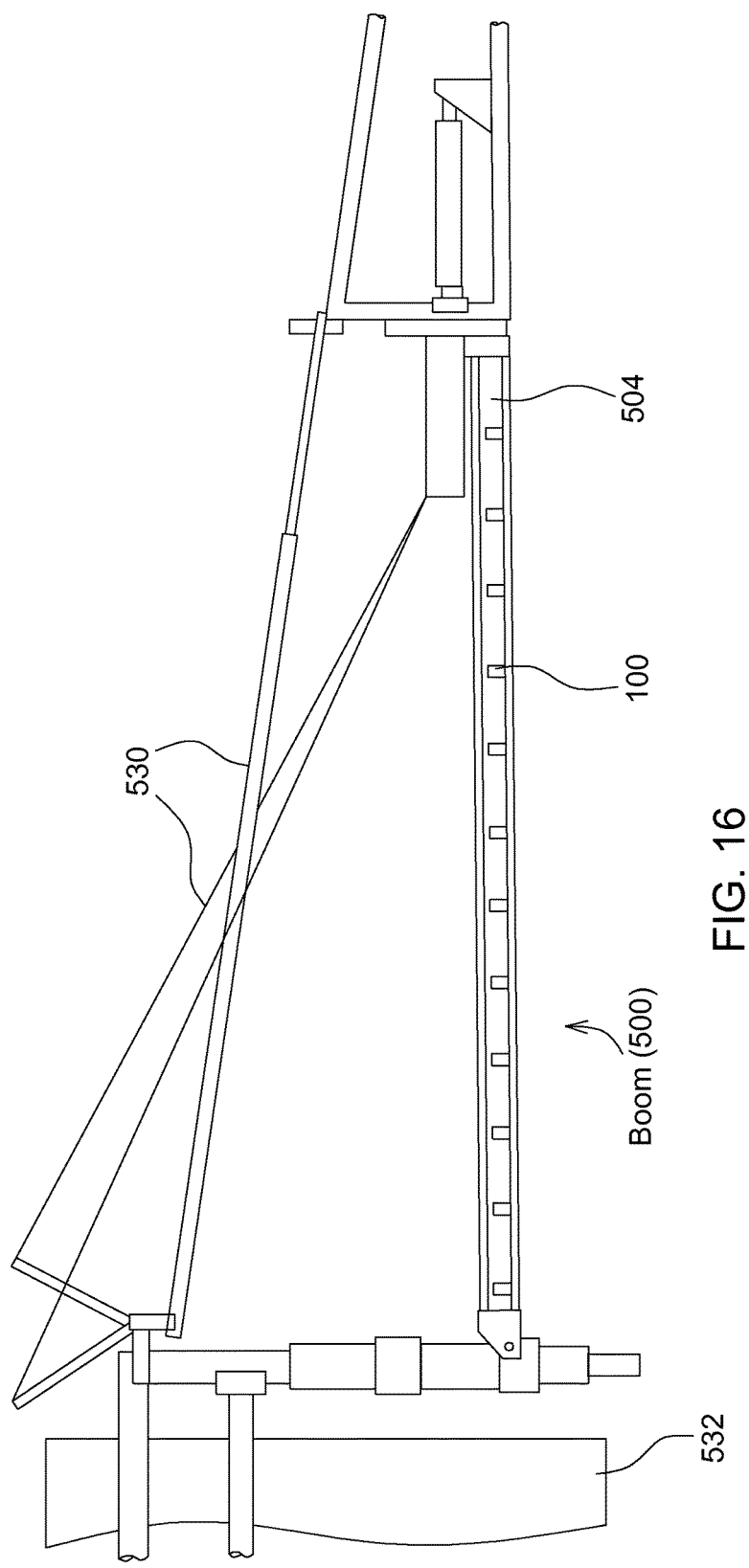
FIG. 16 depicts example nozzles mounted on a sprayer boom or arm.

FIGS. 14 and 16 depict example designs for spray pipes 504 that are rigid enough even when expanded to enable uniform spraying and response to a spray controller. In order to adjust the direction of spray, spray pipe 504 is rotatable about one of its longitudinal axis and is mounted on a step rotator or something similar to rotate spray pipe 504 so that nozzle bodies (e.g. 4A) are pointing in different directions relative to the targeted spray objects. Further, the master spray controller can cantilever sections of the spray pipe 504 in order to adjust for slopes in the terrain or for uneven soil. FIG. 14 depicts an example of the spray pipe 504 being strapped or riveted to one of a long metallic beams inside boom 500. The nozzles 100 are located at intervals along the metallic beam. For a tubular, suspension boom 500 such as depicted in FIG. 15, the spray pipe 504 is mounted behind the boom. The spray pipe 504 is attached to the joints of the boom as well as being strapped to sections of the boom 500; the rigid sections of the spray pipe 504 are attached by bolts and hinges; at the joint where the boom 500 folds, the spray pipe 504 is a flexible tube. The nozzle bodies 4A are mounted to the spray pipe 504 at a location ranging from below the center line of the boom 500 to the top of the boom 500. The suspension type booms 500 generally have a diameter that is larger than the size of the nozzles 100 (i.e. larger than the 115-135 mm size of the nozzle) so that the boom 500 should touch the ground before a nozzle body 4A would. At the end of the boom 500, where the breakaway section has tapered boom sections and the diameter of the boom becomes comparable to the size of a nozzle body 4A, the spray pipe 504 is mounted above the centerline of the breakaway section.

Alternatively, the spray pipe 504 is mounted to the joint sections and below the boom 500. The spray pipe 504 is strapped to the boom 500, along sections of the boom 500. To avoid possible damage to the nozzle bodies 4A when the boom 500 gets close to the ground, sections of the boom 500 such as the breakaway has a prop or protrusion at right angles from the boom so that the extension would touch the ground before a nozzle body 4A would. The prop or protrusion folds when the boom folds because there is a tension wire running along the end of the extension that automatically pulls in the protruded piece.

Finally, the orientation and directions stated and illustrated in this disclosure should not be taken as limiting. Many of the orientations stated in this disclosure and claims are with reference to the direction of travel of the equipment. But, the directions, e.g. "behind" can also are merely illustrative and do not orient the embodiments absolutely in space. That is, a structure manufactured on its "side" or "bottom" is merely an arbitrary orientation in space that has no absolute direction. Also, in actual usage, for example, the nozzles and boom equipment may be operated or positioned at an angle because the implements may move in many directions on a hill; and then, "top" is pointing to the "side." Thus, the stated directions in this application may be arbitrary designations.

What is claimed is:

1. An agricultural sprayer comprising:
a boom assembly coupled to an agricultural vehicle;
at least one single nozzle arranged on the boom assembly, the at least one single nozzle having a fluid inlet connected to three fluid outlets;
a first actuator that couples the fluid inlet to a first outlet based on a first open or closed position of the first actuator, the first actuator connected to a first circuit configured to receive a first modulated duration signal to control the first actuator to be in the first open or closed position;
a second actuator that couples the fluid inlet to a second outlet based on a second open or closed position of the second actuator, the second actuator connected to a second circuit configured to receive a second modulated duration signal to control the second actuator to be in the second open or closed position;
a third actuator that couples the fluid inlet to a third outlet based on a third open or closed position of the third actuator, the third actuator connected to a third circuit configured to receive an aggregate modulated duration signal to control the third actuator to be in the third open or closed position;
wherein the first and second outlet join together to form a combined outlet;
wherein the first actuator is configured to move to the first open position in a different phase relationship with respect to the second open position of the second actuator, wherein the first open position and second open position are based on a duration and a polarity of the first and second modulated duration signals on the first circuit and on the second circuit, respectively, and wherein the duration and the polarity of the second modulated duration signal on the second circuit is determined based on the duration and the polarity of the first modulated duration signal on the first circuit; and wherein the modulated duration signals received by each of the first and second circuits are combined to generate the aggregate modulated duration signal that controls a spray pattern of a fluid dispensed from the combined outlet based on the third open or closed position of the third actuator; and, wherein the different phase relationship comprises a position interleave sequence such that the first open position and the second open position do not overlap in time.

2. The agricultural sprayer of claim 1, wherein the first, second, and aggregate modulated duration signals are generated independently.

3. The agricultural sprayer of claim 1, wherein the first, second, and third actuators include solenoid valves.

4. The agricultural sprayer of claim 1, wherein the first, second, and third circuits comprise electronic traces which further comprise wireless channels.

5. The agricultural sprayer of claim 1, wherein the first, second, and third circuits are mounted on the single nozzle.

6. The agricultural sprayer of claim 1, wherein the third open or closed position of the third actuator is such continuous flow is maintained.

7. The agricultural sprayer of claim 1, wherein at least two of the modulated duration signals are a result of pulse width modulation.

8. The agricultural sprayer of claim 1, wherein the single nozzle is attached to a fluid distribution pipe that is mounted to a foldable composite carbon fiber spray boom.

9. The agricultural sprayer of claim 1, wherein the single nozzle is configured to attach to a fluid distribution pipe mounted on the agricultural sprayer.

10. The agricultural sprayer of claim 1, wherein the first actuator and the second actuator are set up to open 180 degrees out of phase with respect to each other during a period T.

11. An individual spray nozzle comprising:
a fluid inlet connected to three outlets;
a first gate that couples the fluid inlet to a first outlet based on a first open or closed position of the first gate, the first gate connected to a first circuit configured to receive a first pulse width modulated (first PWM) signal to control the first gate to be in the first open or closed position;
a second gate that couples the fluid inlet to a second outlet based on a second open or closed position of the second gate, the second gate connected to a second circuit configured to receive a second pulse width modulated (second PWM) signal to control the second gate to be in the second open or closed position;
a third gate that couples the fluid inlet to a third outlet based on a third open or closed position of the third gate, the third gate connected to a third circuit configured to receive a third pulse width modulated (third PWM) signal to control the third gate to be in the third open or closed position;
wherein the first and second outlet join together to form a combined outlet; and,
wherein the second pulse width modulated signal is interleaved with the first pulse width modulated signal to generate the third pulse with modulated signal which includes an aggregate pulse width modulated signal that controls operations of the third gate to adjust a spray pattern of fluid dispensed from the combined outlet.

12. The individual spray nozzle of claim 11, wherein the third PWM signal has a duty cycle value to maintain continuous spraying.

13. The individual spray nozzle of claim 11, wherein the individual spray nozzle is mounted to a fluid distribution pipe that is mounted to a spray boom comprised of carbon fiber; and the spray boom is mounted to a center frame of a motor vehicle.

14. The individual spray nozzle of claim 11, wherein the first, second, and third circuit and are mounted external to and on top of a portion of the individual spray nozzle.

15. The individual spray nozzle of claim 11, wherein multiple individual spray nozzles are attached to a fluid distribution pipe that is mounted to a foldable suspension-type spray boom.

16. The individual spray nozzle of claim 11, further comprising a second fluid inlet that adjoins the fluid inlet to share a common chamber.

17. A method to operate a spray nozzle, comprising:
setting up a circuit that generates first pulse width modulated (first PWM) signals, second pulse width modulated (second PWM) signals, and third pulse width modulated (third PWM) signals;
configuring the circuit to phase shift first PWM signals from second PWM signals so that their respective pulses do not overlap during a period T;
buffering first PWM signals on a first output of the circuit;
buffering second PWM signals on a second output of the circuit;
generating aggregate PWM signals by interleaving the first PWM signals with the second PWM signals, wherein the aggregate PWM signals includes third pulse width modulated (third PWM) signals;
coupling the circuit to the spray nozzle, wherein the spray nozzle includes a fluid inlet, a first fluid outlet, a second fluid outlet, a third fluid outlet and a combined outlet formed by the joining of the first fluid outlet and the second fluid outlet, and wherein a first valve couples the fluid inlet to the first fluid outlet, a second valve couples the fluid inlet to the second fluid outlet, and a third valve couples the fluid inlet to the third fluid outlet;
connecting the first output to the first valve; connecting the second output to the second valve; and
wherein a spray pattern of fluid dispensed from the third outlet is adjusted based on the aggregate PWM signals; and,
wherein a spray pattern of fluid dispensed from the combined outlet is adjusted based on the phase shifted relation of the first and second PWM signals.

18. The method of claim 17, further comprising selecting a modulation for first PWM signals based on a speed of travel of the spray nozzle and on a prescribed delivery of a particular amount of chemical.

19. The individual spray nozzle of claim 11, wherein the phase of the second PWM signal and the phase of the first PWM signal are synchronous.

20. The individual spray nozzle of claim 11, further comprising additional outlets having respective gates and circuits.

* * * * *